(12) United States Patent
Ren et al.

(10) Patent No.: US 12,001,638 B2
(45) Date of Patent: Jun. 4, 2024

(54) DISPLAY SUBSTRATE AND MANUFACTURING METHOD THEREFOR, AND DISPLAY APPARATUS

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Yanwei Ren, Beijing (CN); Min Liu, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/790,039

(22) PCT Filed: May 12, 2021

(86) PCT No.: PCT/CN2021/093423
§ 371 (c)(1),
(2) Date: Jun. 29, 2022

(87) PCT Pub. No.: WO2021/249098
PCT Pub. Date: Dec. 16, 2021

(65) Prior Publication Data
US 2023/0041797 A1      Feb. 9, 2023

(30) Foreign Application Priority Data

Jun. 8, 2020   (CN) .......................... 202010512916.0

(51) Int. Cl.
*G06F 3/044*     (2006.01)
*G02F 1/1362*    (2006.01)
(Continued)

(52) U.S. Cl.
CPC ...... *G06F 3/0446* (2019.05); *G02F 1/136209* (2013.01); *G02F 1/1368* (2013.01); *G06F 3/04164* (2019.05); *G06F 2203/04103* (2013.01)

(58) Field of Classification Search
CPC ............... G06F 3/0446; G06F 3/04164; G06F 2203/04103; G02F 1/136209; G02F 1/1368
(Continued)

(56) References Cited

U.S. PATENT DOCUMENTS

2017/0097727 A1    4/2017  Wu et al.
2019/0074328 A1*   3/2019  Park ..................... G06F 3/0446
(Continued)

FOREIGN PATENT DOCUMENTS

CN      106066740 A    11/2016
CN      106095167 A    11/2016
(Continued)

*Primary Examiner* — Kwin Xie
(74) *Attorney, Agent, or Firm* — IP & T GROUP LLP

(57) ABSTRACT

A display substrate includes a first base, touch signal lines and touch units. The touch signal lines are disposed on a side of the first base, and lengths of at least two touch signal lines decrease in sequence. The touch units are disposed on a side of the touch signal lines away from the first base, and a touch unit is electrically connected to a touch signal line. Resistances of at least two touch units increase in sequence, and the at least two touch units in an increase order of the resistances in sequence are electrically connected to the at least two touch signal lines in a decrease order of the lengths in sequence, respectively. The touch units each include a touch electrode, and at least one of the at least two touch units further includes an auxiliary electrode stacked with and electrically connected to a touch electrode.

18 Claims, 12 Drawing Sheets

(51) Int. Cl.
  *G02F 1/1368* (2006.01)
  *G06F 3/041* (2006.01)
(58) Field of Classification Search
  USPC .................................................. 345/173–174
  See application file for complete search history.

(56) References Cited

U.S. PATENT DOCUMENTS

| | | | |
|---|---|---|---|
| 2019/0129537 A1* | 5/2019 | Yoshida | G06F 3/0412 |
| 2020/0089351 A1* | 3/2020 | Jeong | G06F 3/0448 |
| 2020/0159350 A1* | 5/2020 | Yang | G06F 3/04164 |
| 2021/0223893 A1 | 7/2021 | Wang et al. | |

FOREIGN PATENT DOCUMENTS

| | | |
|---|---|---|
| CN | 206946456 U | 1/2018 |
| CN | 111665987 A | 9/2020 |
| JP | 2007-156058 A | 6/2007 |

* cited by examiner

DISPLAY SUBSTRATE AND MANUFACTURING METHOD THEREFOR, AND DISPLAY APPARATUS

CROSS-REFERENCE TO RELATED APPLICATIONS

The present disclosure is a national phase entry under 35 USC 371 of International Patent Application No. PCT/CN2021/093423, filed on May 12, 2021, which claims priority to Chinese Patent Application No. 202010512916.0, filed on Jun. 8, 2020, which are incorporated herein by reference in their entirety.

TECHNICAL FIELD

The present disclosure relates to the field of display technologies, and in particular, to a display substrate and a manufacturing method therefor, and a display apparatus.

BACKGROUND

Touch and display driver integration (TDDI) products are widely used due to their advantages of high touch sensitivity, lightness and thinness, and the like.

SUMMARY

In one aspect, a display substrate is provided. The display substrate includes a first base, a plurality of touch signal lines and a plurality of touch units. The plurality of touch signal lines are disposed at a side of the first base, and lengths of at least two touch signal lines decrease in sequence. The plurality of touch control units are disposed on a side of the plurality of touch signal lines away from the first base, and a touch unit is electrically connected to a touch signal line. Resistances of at least two touch units increases in sequence, and the at least two touch units in an increase order of the resistances in sequence are electrically connected to the at least two touch signal lines in a decrease order of the lengths in sequence, respectively. The plurality of touch units each include a touch electrode, and at least one touch unit of the at least two touch units further includes an auxiliary electrode that is stacked with and electrically connected to a touch electrode included in the at least one touch unit.

In some embodiments, in a touch unit including an auxiliary electrode and a touch electrode, a surface of the auxiliary electrode proximate to the touch electrode is in contact with a surface of the touch electrode proximate to the auxiliary electrode; or an insulating layer is provided between the auxiliary electrode and the touch electrode, the insulating layer is provided with a first via hole therein, and the auxiliary electrode and the touch electrode are electrically connected through the first via hole.

In some embodiments, in a touch unit including an auxiliary electrode and a touch electrode, an orthogonal projection of the auxiliary electrode on the first base is within an orthogonal projection of the touch electrode on the first base.

In some embodiments, areas of orthogonal projections of the touch electrodes included in the plurality of touch units on the first base are approximately equal.

In some embodiments, the plurality of touch signal lines extend substantially in a first direction, and are sequentially arranged in a second direction. The first direction intersects with the second direction. The plurality of touch signal lines include a plurality of groups of touch signal lines, and each group of touch signal lines includes at least one touch signal line. A length of a group of touch signal lines proximate to the edge of the first base are greater than a length of a group of touch signal lines proximate to the middle of the first base, and a resistance of a touch unit connected to the group of touch signal lines proximate to the edge of the first base are less than a resistance of a touch unit connected to the group of touch signal lines proximate to the middle of the first base.

In some embodiments, each group of touch signal lines includes touch signal lines, in the first direction that is a direction from one end of the first base to an opposite end thereof, resistances of touch units that are connected to at least one group of touch signal lines increase in sequence.

In some embodiments, each group of touch signal lines includes touch signal lines, areas of orthogonal projections, on the first base, of auxiliary electrodes in touch units that are connected to at least one group of touch signal lines decreases in sequence in the first direction.

In some embodiments, resistances of touch units that are connected to touch signal lines with approximately equal lengths are approximately equal.

In some embodiments, a sum of resistances of each touch signal line and a touch unit connected thereto is approximately equal.

In some embodiments, in a touch unit including an auxiliary electrode and a touch electrode, the auxiliary electrode is located on a side of the touch electrode proximate to the first base. The display substrate further includes a first planarization layer disposed between the plurality of touch signal lines and the plurality of touch units. A surface of the first planarization layer away from the first base is provided with a plurality of grooves therein, and the auxiliary electrode is disposed in a groove of the plurality of grooves.

In some embodiments, a thickness of the auxiliary electrode and a depth of the groove are approximately equal.

In some embodiments, in a touch unit including an auxiliary electrode and a touch electrode, the auxiliary electrode is located on a side of the touch electrode away from the first base. The display substrate further includes a second planarization layer disposed between the plurality of touch signal lines and the plurality of touch units. The touch electrode is disposed on a surface of the second planarization layer away from the first base.

In some embodiments, the display substrate has a display region and a bonding region. The display substrate further includes a plurality of thin film transistors disposed in the display region. Each thin film transistor includes a gate, a source and a drain. Each touch signal line includes a first portion and a second portion, the first portion is located in the display region, an end of the second portion is electrically connected to the first portion, and another end of the second portion extends into the bonding region. The first portion of the touch signal line is disposed in a same layer as the source and the drain. The second portion of the touch signal line is disposed in a same layer as the gate, or is disposed in a same layer as the source and the drain.

In some embodiments, in a touch unit including an auxiliary electrode and a touch electrode, a material of the auxiliary electrode includes a light-transmitting conductive material, and the auxiliary electrode is in a shape of a block; or a material of the auxiliary electrode includes a non-light-transmitting conductive material, and the auxiliary electrode is in a shape of a grid.

In another aspect, a manufacturing method for a display substrate is provided. The manufacturing method for the display substrate includes: providing a first base; forming a plurality of touch control signal lines on a side of the first base, lengths of at least two touch signal lines decreasing in sequence; and forming a plurality of touch units on a side of the plurality of signal lines away from the first base. A touch unit is electrically connected to a touch signal line. Resistances of at least two touch units increase in sequence. The at least two touch units in an increase order of the resistances in sequence are electrically connected to the at least two touch signal lines in a decrease order of the lengths in sequence, respectively. The plurality of touch units each include a touch electrode. At least one touch unit of the at least two touch units further includes an auxiliary electrode that is stacked with and electrically connected to a touch electrode of the at least one touch unit.

In some embodiments, the auxiliary electrode is located on a side of the touch electrode proximate to the first base, forming the plurality of touch units on the side of the plurality of touch signal lines away from the first base includes: forming a planarization film on the side of the plurality of touch signal lines away from the first base; patterning the planarization film to form second via holes for exposing the plurality of touch signal lines in the planarization film, and to form a plurality of grooves on a surface of the planarization film away from the first base, so as to obtain a first planarization layer; forming a first conductive film on a side of the first planarization layer away from the first base; patterning the first conductive film, and reserving portions of the first conductive film located in the plurality of grooves, so as to obtain a plurality of auxiliary electrodes; forming a second conductive film on a side of the plurality of auxiliary electrodes away from the first base; and patterning the second conductive film to obtain a plurality of touch electrodes. An auxiliary electrode of the plurality of auxiliary electrodes or a touch electrode of the plurality of touch electrodes is electrically connected to a touch signal line of the plurality of touch signal lines through at least one second via hole, and the auxiliary electrode is electrically connected to the touch electrode.

In yet another aspect, a display apparatus is provided. The display apparatus includes the display substrate in the embodiments described above, an opposite substrate disposed opposite to the display substrate, and a liquid crystal layer disposed between the display substrate and the opposite substrate.

In some embodiments, the opposite substrate includes a second base, a black matrix disposed on a side of the second base proximate to the display substrate. A material of the auxiliary electrode in the display substrate includes a non-light-transmitting conductive material, and the auxiliary electrode is in a shape of a grid, an orthogonal projection of the auxiliary electrode on the second base is within an orthogonal projection of the black matrix on the second base.

In some embodiments, the display apparatus further includes a touch and display driver integration chip disposed in the bonding region of the display substrate. The touch and display driver integration chip is electrically connected to the plurality of touch signal lines of the display substrate. The touch and display driver integration chip is configured to transmit common voltage signals to the plurality of touch units of the display substrate through the plurality of touch signal lines in a display period of the display apparatus, and to transmit touch control signals to the plurality of touch units through the plurality of touch signal lines in a touch period of the display apparatus.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of products, and actual processes of methods to which the embodiments of the present disclosure relate.

FIG. 10 is a sectional view of the display substrate taken along the line N-N' in

FIG. 3;

DETAILED DESCRIPTION

Figure 1:
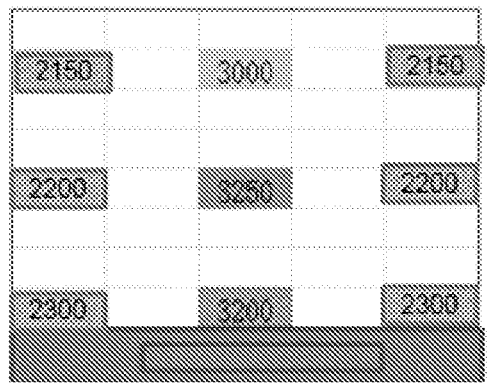
FIG. 1 is a schematic diagram of signal amounts in the related art.

Technical solutions in some embodiments of the present disclosure will be described clearly and completely below with reference to accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example" or "some examples" are intended to indicate that specific features, structures, materials or characteristics related to the embodiment(s) or example(s) are included in at least one embodiment or example of the present disclosure. Schematic representation of the above term does not necessarily refer to the same embodiment(s) or example(s). In addition, the specific features, structures, materials or characteristics may be included in any one or more embodiments or examples in any suitable manner.

Hereinafter, the terms "first" and "second" are only used for descriptive purposes, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the term "connected" and derivatives thereof may be used. For example, the term "connected" may be used in the description of some embodiments to indicate that two or more components are in direct physical or electrical contact with each other. The embodiments disclosed herein are not necessarily limited to the content herein.

As used herein, the term "if", depending on the context, is optionally construed as "when", "in a case where", "in response to determining", or "in response to detecting". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The use of the phase "applicable to" or "configured to" herein means an open and inclusive language, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

As used herein, the term "about" or "approximately" includes a stated value and an average value within an acceptable deviation range of a specific value. The acceptable deviation range is determined by a person of ordinary skill in the art in view of the measurement in question and the error associated with the measurement of a particular quantity (i.e., limitations of the measurement system).

Exemplary embodiments are described herein with reference to sectional views and/or plan views as idealized exemplary drawings. In the accompanying drawings, thickness of layers and sizes of regions are enlarged for clarity. Variations in shapes with respect to the accompanying drawings due to, for example, manufacturing technologies and/or tolerances may be envisaged. Therefore, the exemplary embodiments should not be construed as being limited to the shapes of the regions shown herein, but including deviations in the shapes due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

In some examples, a touch and display driver integration (TDDI) product includes a plurality of touch signal lines and a plurality of touch electrodes electrically connected to the plurality of touch signal lines respectively.

For example, the TDDI product may be applied to a display apparatus of a self-capacitance mode. In this way, when a human body does not touch the TDDI product, a capacitance value of each touch electrode is a constant value; when the human body touches the TDDI product, a capacitance value of a touch electrode corresponding to a position touched by the human body is a sum of the constant value and a capacitance value of the human body, and then, each touch signal line may transmit a capacitance value of a touch electrode correspondingly connected thereto, and a change in the capacitance value of each touch control electrode is detected, so as to determine the position touched by the human body.

In some examples, the TDDI product generally employs a narrow bezel design to increase a screen-to-body ratio. However, it is easy to cause a large difference in lengths of the plurality of touch signal lines. Due to the large difference in the lengths of the plurality of touch signal lines, there is a large difference in resistances of the plurality of touch signal lines. As a result, there is a difference in signal amounts of the TDDI product at different positions, which may affect touch sensitivity of the TDDI product.

Based on this, some embodiments of the present disclosure provide a display substrate. The display substrate may include, for example, an array substrate.

In some embodiments, as shown in FIGS. 2 to 5, the display substrate 100 has a display region A and a non-display region C located on side(s) of the display region A (e.g., one side, two sides or a peripheral side of the display region A). The non-display region C includes a bonding region B. There may be a distance between the display region A and the bonding region B.

In some embodiments, as shown in FIGS. 2 to 5 and FIGS. 7 to 12, the display substrate 100 includes a first base 1.

The first base has various structures, which may be determined according to actual needs. For example, the first base 1 may be a blank base substrate. For another example, the first base 1 may include a blank base substrate and functional thin film(s) (which may include, for example, a buffer layer) disposed on the blank base substrate.

There are various types of the blank base substrate, which may be determined according to actual needs. For example, the blank base substrate may be a polymethyl methacrylate (PMMA) base substrate or a glass base substrate.

In some embodiments, as shown in FIGS. 2 to 5 and FIGS. 7 to 12, the display substrate 100 further includes a plurality of touch signal lines 2 disposed on a side of the first base 1. Here, in a case where the first base 1 includes the blank base substrate and the functional thin film(s) disposed on the blank base substrate, the plurality of touch signal lines 2 may be disposed on a side of the functional thin film(s) away from the blank base substrate.

Figure 2:
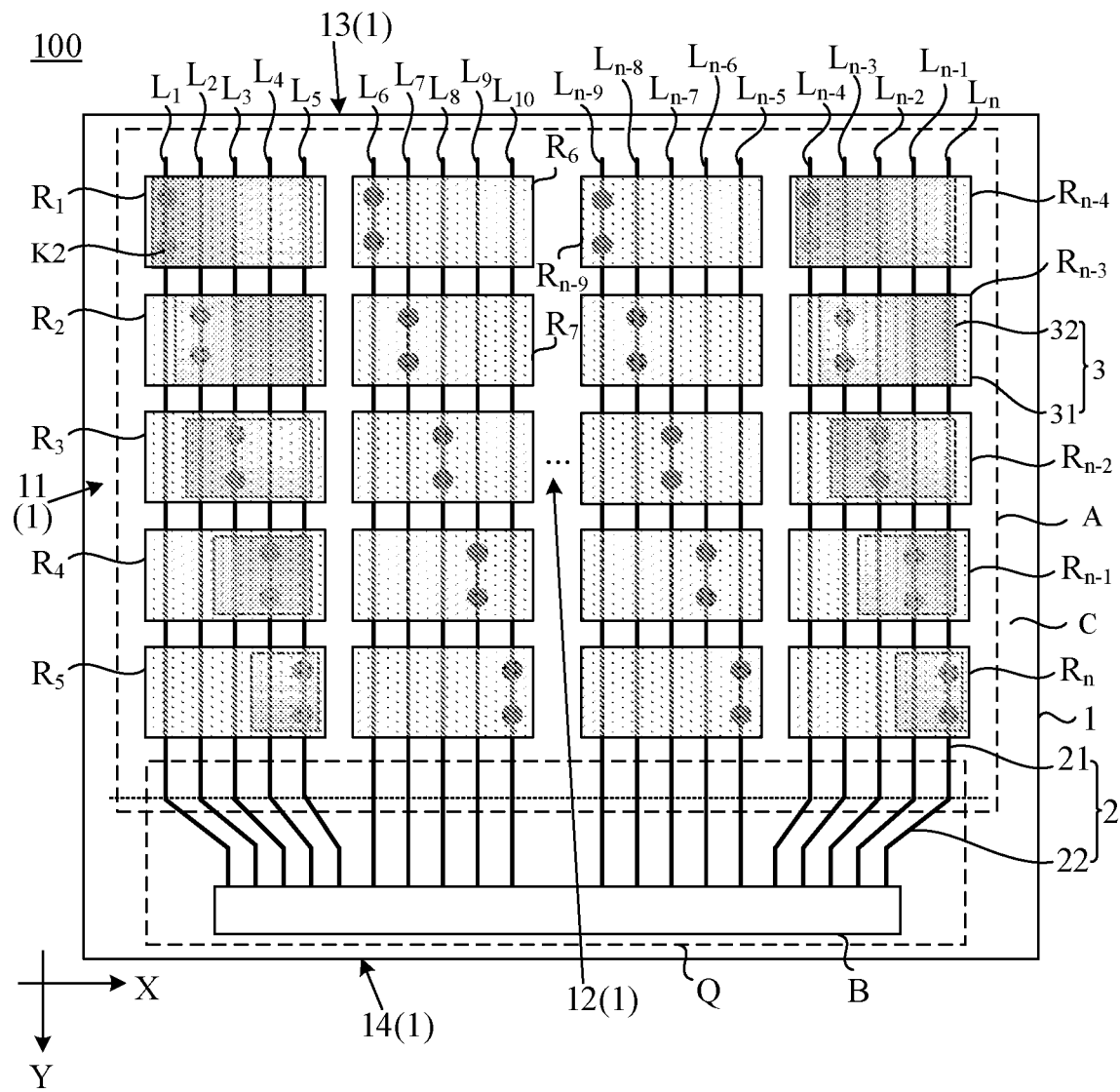
FIG. 2 is a structural diagram of a display substrate, in accordance with some embodiments of the present disclosure.
Figure 3:
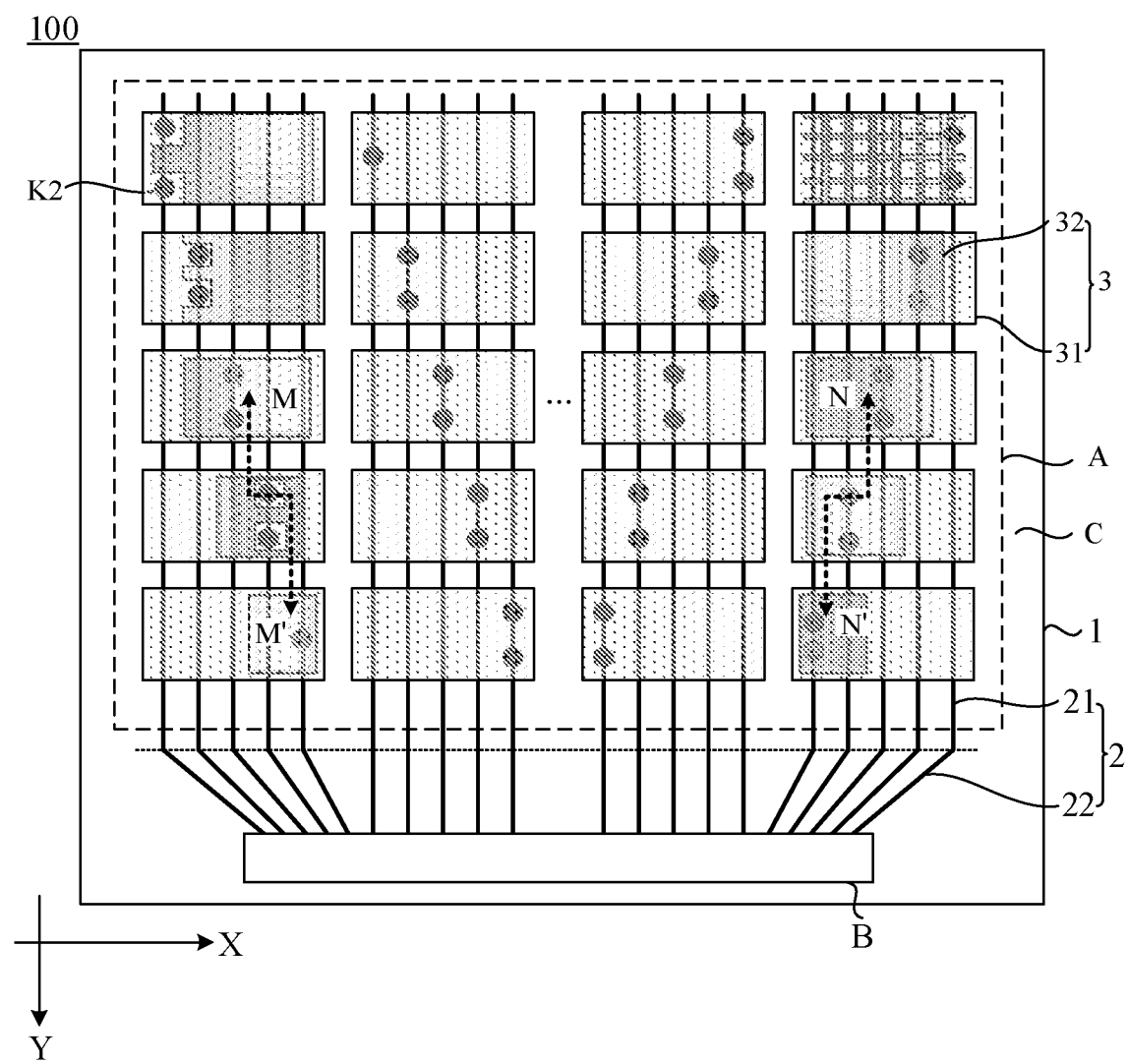
FIG. 3 is a structural diagram of another display substrate, in accordance with some embodiments of the present disclosure.
Figure 4:
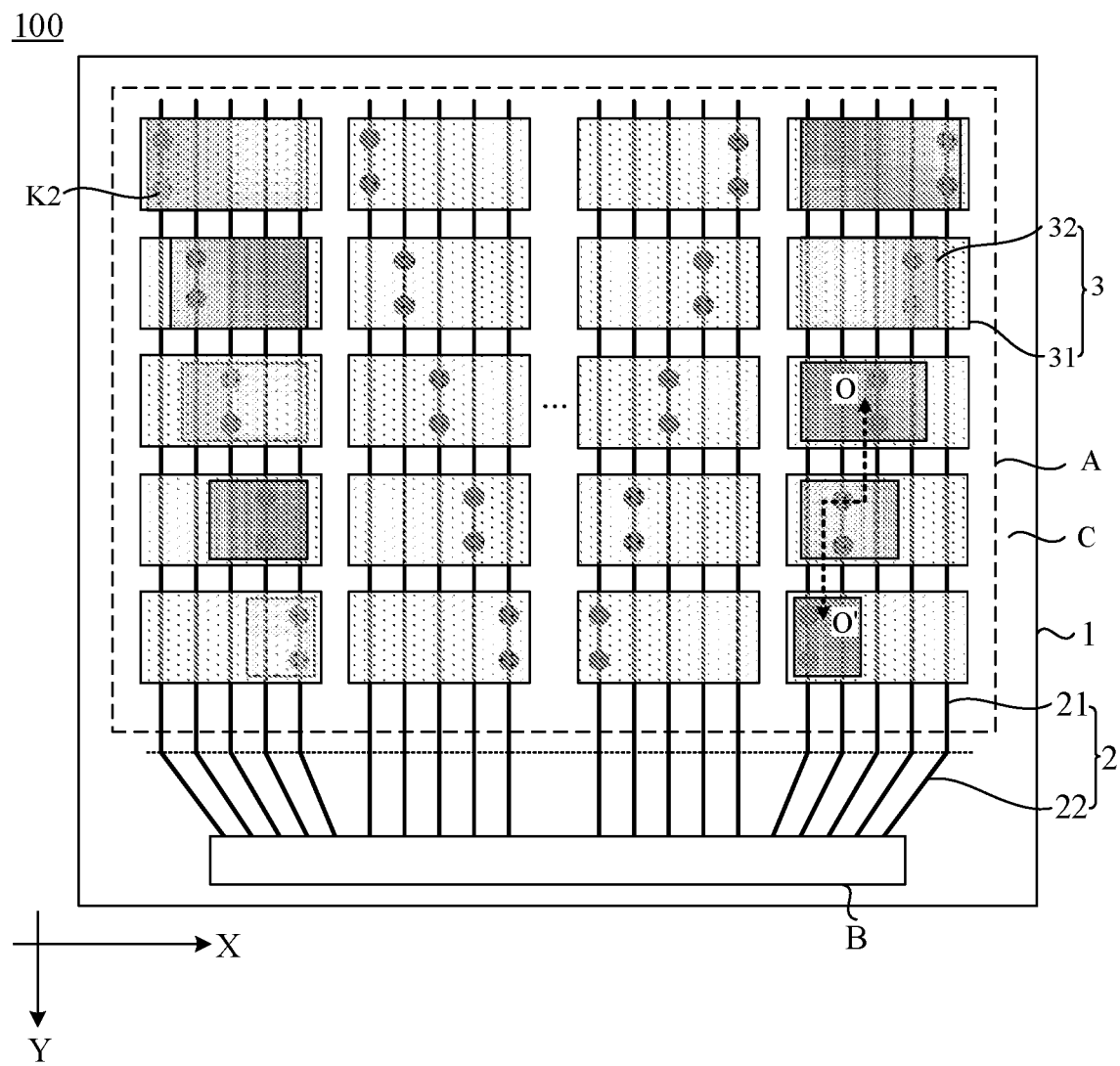
FIG. 4 is a structural diagram of yet another display substrate, in accordance with some embodiments of the present disclosure.

In some examples, as shown in FIGS. 2 to 4, the plurality of touch signal lines 2 extend substantially in a first direction Y, and are sequentially arranged in a second direction X. The first direction Y intersects with the second direction X.

Here, a magnitude of an included angle between the first direction Y and the second direction X may be determined according to actual needs. For example, the first direction Y and the second direction X may be perpendicular to each other. That is, the included angle therebetween is 90°.

The plurality of touch signal lines 2 are sequentially arranged in the second direction X. The touch signal lines 2 may be sequentially arranged in a relatively uniform manner, so as to avoid a phenomenon that at least two touch signal lines 2 intersect with each other to cause a short circuit.

In some examples, as shown in FIG. 2, the plurality of touch signal lines 2 are represented by $L_1, L_2, L_3, L_4, \ldots, L_{n-1}$ and $L_n$.

For example, a size of the bonding region B is relatively small, and the distance between the bonding region B and the display region A is relatively small. In this way, a size of the non-display region C of the display substrate 100 may be reduced, a screen-to-body ratio of the display apparatus to which the display substrate 100 is applied may be increased, and a narrow bezel design may be achieved.

Based on this, the plurality of touch signal lines 2 may be arranged in the manner shown in FIGS. 2 to 4, so that an end of each of the plurality of touch signal lines 2 extends into the bonding region B and is bonded.

In some examples, as shown in FIGS. 2 to 4, each touch signal line 2 includes a first portion 21 and a second portion 22.

For example, as shown in FIGS. 2 to 4, the first portion 21 of the touch signal line 2 is located in the display region A. For example, first portions 21 of the plurality of touch signal lines 2 extend in the first direction Y, and are sequentially arranged in the relatively uniform manner in the second direction X.

For example, as shown in FIGS. 2 to 4 and 6, an end of the second portion 22 of the touch signal line 2 extends into the display region A or be located at a boundary of the display region A, so as to be electrically connected to the first portion 21 of the touch signal line 2; and another end of the second portion 22 may extend into the bonding region B to be bonded. Here, since the size of the bonding region B is relatively small, second portions 22 of a part of the touch signal lines 2 extends in the first direction Y, and second portions 22 of another part of the touch signal lines 2 extends substantially in the first direction Y. That is, there is an included angle between the second portions 22 of the part of the touch signal lines 2 and the second portions 22 of the another part of the touch signal lines 2. As shown in FIG. 2, there is an included angle between an extending direction of second portions 22 of touch signal lines $L_1, L_2, L_3, L_4, L_5$ and an extending direction of second portions 22 of touch signal lines $L_6, L_7, L_8, L_9, L_{10}$. Here, the included angle may be, for example, an acute angle.

Based on this, the lengths of the plurality of touch signal lines 2 are different, so that resistances of the plurality of touch signal lines 2 are different.

In some examples, as shown in FIGS. 2 to 4, among the plurality of touch signal lines 2, lengths of at least two touch signal lines 2 decrease in sequence (that is, resistances of the at least two touch signal lines 2 decrease in sequence). The at least two touch signal lines 2 may be, for example, at least two touch signal lines 2 arranged at interval or at least two touch signal lines 2 adjacent to each other.

For example, it may be seen from FIG. 2 that, a length of the touch signal line $L_1$ is greater than a length of the touch signal line $L_2$, and the length of the touch signal line $L_2$ is greater than a length of the touch signal line $L_3$; the length of the touch signal line $L_1$ is greater than the length of the touch signal line $L_3$, and the length of the touch signal line $L_3$ is greater than a length of the touch signal line $L_5$; and the length of the touch signal line $L_1$ is greater than a length of the touch signal line $L_4$, and the length of the touch signal line $L_4$ is greater than the length of the touch signal line $L_5$.

Of course, among the plurality of touch signal lines 2, the lengths of the at least two touch signal lines 2 may be equal or approximately equal (that is, the resistances of the at least two touch signal lines 2 may be equal or approximately equal). The at least two touch signal lines 2 may be, for example, at least two touch signal lines 2 arranged at interval or at least two touch signal lines 2 adjacent to each other.

For example, it may be seen from FIG. 2 that, a length of the touch signal line $L_6$ is equal to a length of the touch signal line $L_8$, and the length of the touch signal line $L_8$ is equal to a length of the touch signal line $L_9$, and the touch signal line $L_9$ is equal to a length of a touch signal line the length of the touch signal line $L_1$ is equal to a length of a touch signal line $L_n$, and the length of the touch signal line $L_5$ is equal to a length of a touch signal line $L_{n-4}$.

By setting lengths of a part of the plurality of touch signal lines 2 to be relatively large and lengths of another part of the plurality of touch signal lines 2 to be relatively small, it is beneficial to reduce the size of the bonding region B and is further beneficial to reduce the size of the non-display region C. In this way, it is beneficial to achieve a narrow bezel of the display substrate 100.

In some embodiments, as shown in FIGS. 2 to 4 and 7 to 12, the display substrate 100 further includes a plurality of touch units 3 disposed on a side of the plurality of touch signal lines 2 away from the first base 1.

For example, as shown in FIG. 2, the plurality of touch units 3 are represented by $R_1, R_2, R_3, R_4, \ldots, R_{n-1}$ and $R_n$ respectively. The touch signal line $L_1$ is electrically connected to the touch unit $R_1$ correspondingly, the touch signal line $L_2$ is electrically connected to the touch unit $R_2$ correspondingly, the touch signal line $L_3$ is electrically connected to the touch unit $R_3$ correspondingly, . . . , and the touch signal line $L_n$ is electrically connected to the touch unit $R_n$ correspondingly.

In some examples, as shown in FIGS. 2 to 4, a touch unit 3 may be electrically connected to a touch signal line 2. Alternatively, the touch unit 3 may be electrically connected to touch signal lines 2, which is not limited in the embodiments of the present disclosure.

In this way, a signal from the bonding region B may be transmitted to a corresponding touch unit 3 through the touch signal line(s) 2, or a signal from the touch unit 3 may be transmitted to the bonding region B through the corresponding touch signal line(s) 2. In a touch period, a touch control signal from the bonding region B may be transmitted to the corresponding touch unit 3 through the touch signal line(s) 2, and a touch feedback signal (e.g., a capacitance value) from the touch unit 3 is transmitted to the bonding region B when a touch occurs.

Here, it will be noted that, since the touch signal line 2 and the touch unit 3 both have resistances, a voltage drop phenomenon may occur after the touch control signal from the bonding region B is transmitted to the touch unit 3. However, due to the difference in the lengths of the plurality of touch signal lines, there is a difference in the resistances (e.g., line resistance) of the plurality of touch signal lines, and in turn there is a difference in signal amounts of touch control signals transmitted to the touch units 3 at different positions.

In the related art, as shown in FIG. 1, values of a column of signal amounts on the left and values of a column of signal amounts on the right in the figure correspond to positions where touch signal lines 2 with a long length are located, and values of a column of signal amounts in the middle correspond to positions where touch signal lines 2 with a short length are located. It may be seen from FIG. 1, an average value of the column of signal amounts on the left and an average value of the column of signal amounts on the right are about 2200, and an average value of the column of signal amounts in the middle is about 3100. The average value of the column of signal amounts on the left and the average value of the column of the signal amounts on the right are both less than the average value of the column of the signal amounts in the middle.

In some examples of the present disclosure, among the plurality of touch units 3, resistances (e.g., surface resistances) of at least two touch units 3 increase in sequence. As shown in FIGS. 2 to 4, and 7 to 12, each touch unit 3 includes a touch electrode 31, and at least one touch unit 3 of the at least two touch units 3 further includes an auxiliary electrode 32 that is stacked with and electrically connected to the touch electrode 31. That is, the auxiliary electrode 32 is disposed on a side of the touch electrode 31 and is electrically connected to the touch electrode 31, so that the resistance of the touch unit 3 may be adjusted. For example, the resistance of the touch unit 3 may be reduced.

For example, as shown in FIG. 2, in a touch unit $R_5$ and a touch unit $R_6$, a resistance of the touch unit $R_6$ only including the touch electrode 31 is greater than a resistance of the touch unit $R_5$ including the touch electrode 31 and the auxiliary electrode 32.

It will be noted that the at least two touch control units 3 may each include the touch electrode 31 and the auxiliary electrode 32.

For example, a resistance of the touch unit $R_4$ and the resistance of the touch unit $R_5$ increase in sequence, and the touch unit $R_4$ and the touch unit $R_5$ each include the touch electrode 31 and the auxiliary electrode 32. Here, the auxiliary electrode 32 and the touch electrode 31 are stacked and electrically connected, which may not only reduce the resistance of the touch unit 3, but also ensure that the auxiliary electrode 32 is located in the display region A, thereby avoiding increasing an area of the non-display region C of the display substrate 100 and in turn avoiding affecting achievement of the narrow bezel of the display substrate 100.

In some examples, as shown in FIGS. 2 to 4, the at least two touch units 3 in an increase order of resistances in sequence are electrically connected to the at least two touch signal lines 2 in a decrease order of lengths in sequence, respectively. That is, a touch signal line 2 with a long length is electrically connected to a touch unit 3 with a small resistance, and a touch signal line 2 with a short length is electrically connected to a touch unit 3 with a large resistance. For example, the touch signal line $L_1$ with a long length is electrically connected to the touch unit $R_1$ with a small resistance, the touch signal line $L_6$ with a short length is electrically connected to the touch unit $R_6$ with a large resistance.

In this way, a difference of sums each of resistances of the touch signal line 2 and the respective touch unit 3 may be reduced, and in turn, in the touch period, a difference of voltage drops of the signal amounts of the touch control signals transmitted to the touch units 3 may be reduced. As a result, a difference in the signal amounts of the touch control signals transmitted to the touch control units 3 at different positions is reduced.

Therefore, by arranging the auxiliary electrode 32 in each of a part of touch control units 3 of the plurality of touch control units 3 included in the display substrate 100 provided by some embodiments of the present disclosure, it is possible to reduce the resistance of the touch control unit 3 by using the auxiliary electrode 32. Moreover, the at least two touch units 3 with increase resistances in sequence in the increase order of the resistances in sequence are electrically connect to the at least two touch signal lines 2 with the decrease lengths in sequence in the decrease order of the lengths in sequence respectively, so that the difference in the sums each of the resistances of the touch signal line 2 and the respective touch unit 3 may be reduced. In this way, in the touch period, the difference in the signal amounts of the touch control signals transmitted to the touch control units 3 at the different positions may be reduced, thereby effectively improving touch sensitivity of the display substrate 100.

In some embodiments, as shown in FIGS. 2 to 4, areas of orthogonal projections of the touch electrodes 31 in the touch units 3 on the first base 1 are equal or approximately equal, which means that the resistances of the touch electrodes 31 in the touch units 3 are equal or approximately equal.

In the embodiments of the present disclosure, the auxiliary electrode 32 is disposed on a side of the touch electrode 31 and is electrically connected to the touch electrode 31, so as to reduce resistances of a part of the touch units 3. By ensuring that the resistances of the touch electrodes 31 included in the touch units 3 are equal or approximately equal, it is easy to obtain directly decrease amounts of the resistances of the touch units 3 after the auxiliary electrodes 32 are provided. In this way, the resistances of the touch units 3 may be adjusted simply and accurately by adjusting the resistances of the auxiliary electrodes 32.

In addition, in a process of manufacturing the touch electrodes 31, an existing mask may be used. In this way, it is possible to avoid adding a new mask, and then avoid a significant increase in manufacturing cost of the display substrate 100.

In some embodiments, as shown in FIGS. 2 to 4, in the touch unit 3 including the auxiliary electrode 32 and the touch electrode 31, an orthogonal projection of the auxiliary electrode 32 on the first base 1 is within an orthogonal projection of the touch electrode 31 on the first base 1.

In this way, the resistance of the touch control unit 3 may be adjusted (e.g., reduced) by using the auxiliary electrode 32, and moreover, an area occupied by the auxiliary electrode 32 may be reduced, and it is ensured that an arrangement of the touch electrodes 31 remain unchanged, so as to avoid an influence of an arrangement of the auxiliary electrode 32 on the area of the non-display region C of the display substrate 100, thereby avoiding an influence on the achievement of the narrow bezel of the display substrate 100.

It will be noted that there is inevitably certain errors of equipment for manufacturing the auxiliary electrode 32 and the touch electrode 31. Therefore, when the auxiliary electrode 32 and the touch electrode 31 are manufactured, a situation that the auxiliary electrode 32 and the touch electrode 31 are misaligned may occur. That is, the orthogonal projection of the auxiliary electrode 32 on the first base 1 partially overlaps with the orthogonal projection of the touch electrode 31 on the first base 1. Of course, the embodiments of the present disclosure do not exclude this situation.

In some embodiments, as shown in FIGS. 2 to 4, the resistances of the touch units 3 that are connected to the touch signal lines 2 with the equal or approximately equal lengths are equal or approximately equal. For example, in a case where the different touch units 3 each include the touch electrode 31 and the auxiliary electrode 32, the areas of the orthogonal projections of the touch electrodes 31 on the base are equal or approximately equal, and areas of orthogonal projections of the auxiliary electrodes 32 on the base are equal or approximately equal.

In some examples, as shown in FIG. 2, lengths of the touch signal line $L_6$ and the touch signal line $L_7$ are equal or approximately equal, and the resistance of the touch unit $R_6$ connected to the touch signal line $L_6$ and a resistance of the touch unit $R_7$ connected to the touch signal line $L_7$ are equal or approximately equal.

The resistances of the touch signal lines 2 with the equal or approximately equal lengths are equal or approximately equal. Therefore, in a case where the resistances of the touch units 3 that are connected to the touch signal lines 2 with the equal or approximately equal lengths are equal or approximately equal, a sum of resistances of a certain touch signal line 2 and a touch unit 3 connected thereto is equal or approximately equal to a sum of resistances of a touch signal line 2 whose length is equal or approximately equal to a length of the certain touch signal line 2 and a touch unit 3 connected thereto. In this way, in the touch period, there is basically no difference in signal amounts of touch control signals transmitted to the touch units 3 that are connected to the touch signal lines 2 with the equal or approximately equal lengths, so that the difference of the signal amounts of the touch control signals transmitted to the touch control units 3 at the different positions may be further reduced, and the touch sensitivity of the display substrate 100 may be further improved.

In some embodiments, the sum of the resistances of each touch signal line 2 and the touch unit 3 connected thereto is equal or approximately equal.

For example, as shown in FIG. 2, a sum of resistances of the touch signal line $L_1$ and the touch unit $R_1$ connected thereto, a sum of resistances of the touch signal line $L_2$ and the touch unit $R_2$ connected thereto, . . . , a sum of resistances of the touch signal line $L_6$ and the touch unit $R_6$ connected thereto, . . . , and a sum of resistances of the touch signal line $L_n$ and the touch unit $R_n$ connected thereto are equal or approximately equal.

It means that, there are the same or substantially the same voltage drops after the touch control signals are transmitted to the touch units 3 at the different positions, so that there is no or basically no difference in the signal amounts of the touch control signals transmitted to the touch control units 3 at the different positions, which may further improve the touch sensitivity of the display substrate 100.

In some embodiments, there are various arrangements of the plurality of touch signal lines 2 and the plurality of touch units 3 included in the display substrate 100, which may be determined according to actual needs.

In some examples, the plurality of touch signal lines 2 include a plurality of groups of touch signal lines 2, and each group of touch signal lines 2 includes at least one touch signal line 2. That is, each group of touch signal lines 2 may include one touch signal line 2 or more (e.g., two, three or four) touch signal lines 2.

For example, as shown in FIG. 2, in an example in which each group of touch signal lines 2 includes five touch signal lines 2. A first group of touch signal lines 2 includes the touch signal lines $L_1$, $L_2$, $L_3$, $L_4$, and $L_5$; a second group of touch signal lines 2 includes the touch signal lines $L_6$, $L_7$, $L_8$, $L_9$, and $L_{10}$; . . . ; a ((n/5)-1)th group of touch signal lines 2 includes touch signal lines $L_{n-9}$, $L_{n-8}$, $L_{n-7}$, $L_{n-6}$, and $L_{n-5}$, and a (n/5)th group of touch signal line 2 includes touch signal lines $L_{n-4}$, $L_{n-3}$, $L_{n-2}$, $L_{n-1}$, and $L_n$.

As shown in FIG. 2, in the second direction X that is a direction from an edge 11 of the first base 1 to the middle 12 of the first base 1, there are at least two groups of touch signal lines 2. That is, there are two groups of touch signal lines 2; alternatively, there are three or more groups of touch signal lines 2.

Of the at least two groups of touch signal lines 2, a length of a group of touch signal lines 2 proximate to the edge of the first base 1 are greater than a length of a group of touch signal lines 2 proximate to the middle of the first base 1. Resistance of a touch unit 3 connected to the group of touch signal lines 2 proximate to the edge of the first base 1 is less than resistance of a touch unit 3 connected to the group of touch signal lines 2 proximate to the middle of the first base 1.

In a case where there are two groups of touch signal lines 2 in the second direction X that is the direction from the edge of the first base 1 to the middle of the first base 1, the two groups of touch signal lines 2 include, for example, a first group of touch signal lines 2 and a second group of touch signal lines 2.

A length of each touch signal line 2 in the first group of touch signal lines 2 is greater than a length of each touch signal line 2 in the second group of touch signal lines 2, and a resistance of each touch unit 3 connected to the first group of touch signal lines 2 is less than a resistance of each touch unit 3 connected to the second group of touch signal lines 2. Of course, a length of a certain touch signal line 2 in the first group of touch signal lines 2 may be equal to a length of a certain touch signal line 2 in the second group of touch signal lines 2, and is greater than lengths of other touch signal lines 2 in the second group of touch signal lines 2; a resistance of a touch unit 3 connected to the certain touch signal line 2 in the first group of touch signal lines 2 may be equal to a resistance of a touch unit 3 connected to the certain touch signal line 2 in the second group of touch signal lines 2, and is less than resistances of touch units 3 connected to the other touch signal lines 2 in the second group of touch signal lines 2.

For example, as shown in FIG. 2, the length of the touch signal line $L_1$ in the first group of touch signal lines 2 is greater than lengths of the touch signal lines $L_6$ to $L_{10}$ in the second group of touch signal lines 2, the length of the touch signal line $L_5$ in the first group of touch signal lines 2 is greater than the length of the touch signal line $L_6$ in the second group of touch signal lines 2, and is greater than lengths of the touch signal lines $L_7$ to $L_{10}$ in the second group of touch signal lines 2. The resistance of the touch unit $R_1$ connected to $L_1$ in the first group of touch signal lines 2 is less than the resistance of the respective touch unit 3 connected to each touch signal line 2 in the second group of touch signal lines 2. The resistance of the touch unit $R_5$ connected to the touch signal line $L_5$ in the first group of touch signal lines 2 is less than the resistance of the respective touch unit 3 connected to each touch signal line 2 in the second group of touch signal lines 2. The touch signal lines 2 in FIG. 2 are only illustration for the touch signal lines 2 included in the display substrate 100, rather than a specific limitation on the length or shape of each touch signal line 2.

In a case where there are three or more groups of touch signal lines 2 in the second direction X that is the direction from the edge of the first base 1 to the middle of the first base 1, an example in which there are three groups of touch signal lines 2 and the three groups of touch signal lines 2 include the first group of touch signal lines 2, the second group of touch signal lines 2 and a third group of touch signal lines 2 is described below. The third group of touch signal lines 2 is not shown in FIG. 2.

A length of each touch signal line 2 in the first group of touch signal lines 2, a length of each touch signal line 2 in the second group of touch signal lines 2, and a length of each touch signal line 2 in the third group of touch signal lines may decrease in sequence. Correspondingly, a resistance of each touch unit 3 connected to the first group of touch signal lines 2, a resistance of each touch unit 3 connected to the second group of touch signal lines 2, and a resistance of each touch unit 3 connected to the third group of touch signal lines 2 may increase in sequence. A comparison of the lengths of the touch signal lines 2 in each group of touch signal lines 2, and a comparison of the resistances of the touch units 3 connected to the touch signal lines 2 may refer to the descriptions in the above examples, and details will not be repeated here.

In this way, the plurality of touch signal lines 2 and the plurality of touch units 3 may be arranged symmetrically respectively with respect to a center line of the first base 1 in the second direction X as a symmetric line.

Here, for example, in a case where each group of touch signal lines 2 includes touch signal lines 2, in the second direction X that is the direction from the edge of the first base 1 to the middle of the first base 1, lengths of touch signal lines 2 in at least one group of touch signal lines 2 decrease in sequence.

For example, as shown in FIG. 2, in the first group of touch signal lines 2, the length of the touch signal line $L_1$ is greater than the length of the touch signal line $L_2$, the length of the touch signal line $L_2$ is greater than the length of the touch signal line $L_3$, the length of the touch signal line $L_3$ is greater than the length of the touch signal line $L_4$, and the length of the touch signal line $L_4$ is greater than the length of the touch signal line $L_5$; in the (n/5)th group touch signal lines 2, the length of the touch signal line $L_n$ is greater than a length of the touch signal line $L_{n-1}$, the length of the touch signal line $L_{n-1}$ is greater than a length of the touch signal line $L_{n-2}$, the length of the touch signal line $L_{n-2}$ is greater than a length of the touch signal line $L_{n-3}$, and the length of the touch signal line $L_{n-3}$ is greater than the length of the touch signal line $L_{n-4}$.

In this way, a situation that the touch signal lines 2 intersect with each other to cause the short circuit may be avoided, and an area occupied by the touch signal lines 2 is reduced so as to avoid increasing the area of the non-display region C of the display substrate 100 due to an arrangement of the touch signal lines 2.

Here, an arrangement of touch units 3 connected to a same group of the touch signal lines 2 may be determined according to actual needs.

For example, as shown in FIGS. 2 to 4, resistances of touch units 3 connected to at least one group of touch signal lines 2 increase in sequence.

For example, as shown in FIG. 2, in the first direction Y that is a direction from a top end 13 of the first base 1 to an opposite bottom end 14 thereof, in the touch units 3 electrically connected to the first group of touch signal lines 2, the resistance of the touch unit $R_1$ is less than the resistance of the touch unit $R_2$, the resistance of the touch unit $R_2$ is less than the resistance of the touch unit $R_3$, the resistance of the touch unit $R_3$ is less than the resistance of the touch unit $R_4$, and the resistance of the touch unit $R_4$ is less than the resistance of the touch unit $R_5$.

For example, as shown in FIGS. 2 to 4, areas of orthogonal projections, on the first base 1, of auxiliary electrodes 32 included in touch units 3 connected to at least one group of touch signal lines 2 decreases in sequence. That is, resistances of the auxiliary electrodes 32 increase in sequence in the first direction Y.

For example, as shown in FIG. 2, the touch units 3 electrically connected to the first group of touch signal lines 2 are taken as an example, the touch signal lines 2 in the first group are arranged in the second direction X that is the direction from the edge of the first base 1 to the middle of the first base 1, an area of an auxiliary electrode 32 in the touch unit $R_1$ is greater than an area of an auxiliary electrode 32 included in the touch unit $R_2$, the area of the auxiliary electrode 32 included in the touch unit $R_2$ is greater than an area of an auxiliary electrode 32 included in the touch unit $R_3$, the area of the auxiliary electrode 32 included in the touch unit $R_3$ is greater than an area of an auxiliary electrode 32 included in the touch unit $R_4$, and the area of the auxiliary electrode 32 included in the touch unit $R_4$ is greater than an area of an auxiliary electrode 32 included in the touch unit $R_5$. Correspondingly, a resistance of the auxiliary electrode 32 included in the touch unit $R_1$ is less than a resistance of the auxiliary electrode 32 included in the touch unit $R_2$, the resistance of the auxiliary electrode 32 included in the touch unit $R_2$ is less than a resistance of the auxiliary electrode 32 included in the touch unit $R_3$, the resistance of the auxiliary electrode 32 included in the touch unit $R_3$ is less than a resistance of the auxiliary electrode 32 included in the touch unit $R_4$, and the resistance of the auxiliary electrode 32 included in the touch unit $R_4$ is less than a resistance of the auxiliary electrode 32 included in the touch unit $R_5$.

In some other examples, in the second direction X that is the direction from one end of the first base 1 to the opposite end thereof, the plurality of touch signal lines 2 may be sequentially arranged according to a decrease order of the lengths in sequence, and in this case, the plurality of touch units 3 may be sequentially arranged according to an increase order of the resistances in sequence; alternatively, the plurality of touch signal lines 2 may be sequentially arranged according to an increase order of the lengths in sequence, and in this case, the plurality of touch units 3 may be sequentially arranged according to a decrease order of the resistances in sequence.

In some embodiments, in the touch unit 3 including the auxiliary electrode 32 and the touch electrode 31, there are various connection relationships between the auxiliary electrode 32 and the touch electrode 31, which may be determined according to actual needs.

Figure 11:
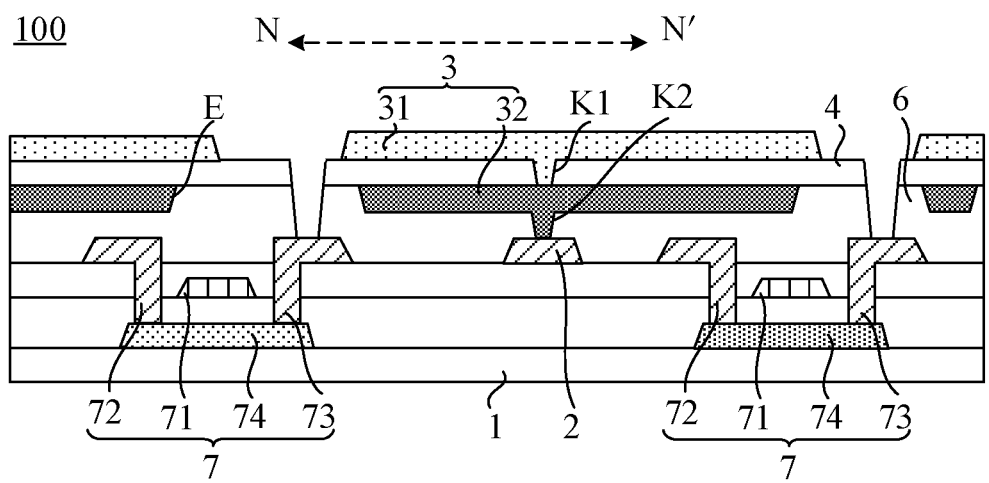
FIG. 11 is another sectional view of the display substrate taken along the line N-N' in FIG. 3.

In some examples, as shown in FIG. 11, an insulating layer 4 is provided between the auxiliary electrodes 32 and the touch electrodes 31. The insulating layer 4 has a first via hole K1, and the auxiliary electrode 32 is electrically connected to the touch electrode 31 through the first via hole K1.

In an example where the auxiliary electrode 32 is located on a side of the touch electrode 31 proximate to the first base 1, by providing the insulating layer 4, it is possible to avoid a poor effect on a shape of the auxiliary electrode 32 in a process of forming the touch electrode 31.

In some other examples, as shown in FIGS. 7 to 10 and 12, a surface of the auxiliary electrode 32 proximate to the touch electrode 31 is in contact with a surface of the touch electrode 31 proximate to the auxiliary electrode 32. That is, no other film layer is provided therebetween, and the auxiliary electrode 32 is in direct contact with the touch electrode 31. In this way, the number of film layers in the display substrate 100 may be reduced, so as to avoid increasing a thickness of the display substrate 100.

In some embodiments, in the touch unit 3 including the auxiliary electrode 32 and the touch electrode 31, there are various positional relationships between the auxiliary electrode 32 and the touch electrode 31, which may be determined according to actual needs.

Figure 12:
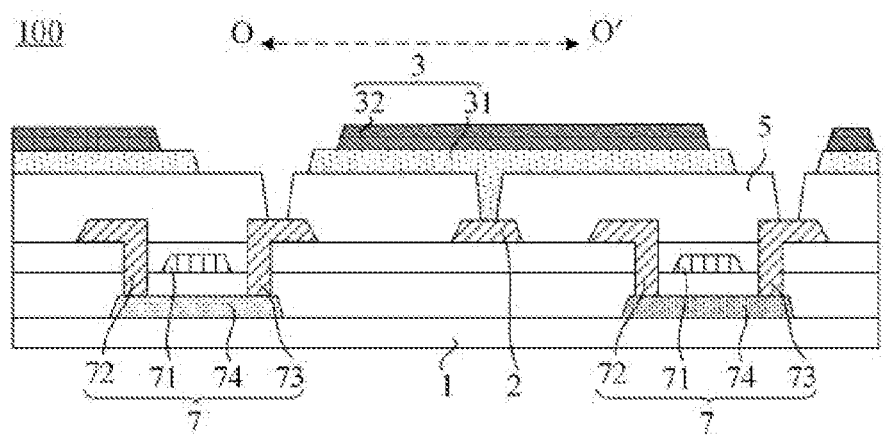
FIG. 12 is a sectional view of the display substrate taken along the line O-O' in FIG. 4.

In some examples, as shown in FIG. 12, the auxiliary electrode 32 is located on a side of the touch electrode 31 away from the first base 1.

For example, as shown in FIG. 12, the surface of the auxiliary electrode 32 proximate to the touch electrode 31 is in contact with the surface of the touch electrode 31 proximate to the auxiliary electrode 32.

As shown in FIG. 12, the display substrate 100 further includes a second planarization layer 5 disposed between the plurality of touch signal lines 2 and the plurality of touch units 3.

By providing the second planarization layer 5, the touch unit 3 located on a surface of the second planarization layer 5 away from the first base 1 may have a relatively flat structure and have a good continuity, so as to avoid the occurrence of cracks inside of the touch unit 3.

For example, as shown in FIG. 12, the touch electrode 31 is disposed on a surface of the second planarization layer 5 away from the first base 1.

In this way, in a process of manufacturing the display substrate 100, the touch unit 3 may be obtained by only sequentially forming the touch electrode 31 and the auxiliary electrode 32 on the surface of the second planarization layer 5 away from the first base 1 without adding other manufacturing processes, which is beneficial to simplify the manufacturing process of the display substrate 100.

In some other examples, as shown in FIGS. 7 to 11, the auxiliary electrode 32 is located on the side of the touch electrode 31 proximate to the first base 1.

For example, as shown in FIGS. 7 to 10, the surface of the auxiliary electrode 32 proximate to the touch electrode 31 is in contact with the surface of the touch electrode 31 proximate to the auxiliary electrode 32.

As shown in FIGS. 7 to 10, the display substrate 100 further includes a first planarization layer 6 disposed between the plurality of touch signal lines 2 and the plurality of touch units 3.

By providing the first planarization layer 6, the touch unit 3 located on a surface of the first planarization layer 6 away from the first base 1 may have a relatively flat structure and have a good continuity, so as to avoid the occurrence of cracks inside of the touch unit 3.

For example, as shown in FIGS. 7 to 10, a surface of the first planarization layer 6 away from the first base 1 is provided with a plurality of grooves E therein, and each auxiliary electrode 32 is disposed in a groove E of the plurality of grooves E. For example, the auxiliary electrodes 32 may be in one-to-one correspondence with the grooves E. That is, only one auxiliary electrode 32 is disposed in each groove E.

By providing the auxiliary electrode 32 in the groove E of the first planarization layer 6, it is possible to reduce a distance between a surface of the auxiliary electrode 32 away from the first base 1 and a portion, not covered by the auxiliary electrode 32, of the surface of the first planarization layer 6 away from the first base 1, so that an overall structure of the touch electrodes 31 that is disposed on the surface of the auxiliary electrode 32 away from the first base 1 may be relatively flat. In this way, in a case where the display substrate 100 is applied to the display apparatus, distances between the touch electrode 31 and touched positions may be relatively uniform, so as to avoid affecting the touch sensitivity of the display apparatus.

For example, as shown in FIGS. 7 to 10, a thickness of the auxiliary electrode 32 (i.e., a dimension of the auxiliary electrode 32 in a direction perpendicular to the first base 1) and a depth of the groove E (i.e., a dimension of the groove E in the direction perpendicular to the first base 1) are equal or approximately equal.

In this way, by providing the auxiliary electrode 32 in the corresponding groove E, the surface of the auxiliary electrode 32 away from the first base 1 may be flush with or substantially flush with the portion, not covered by the auxiliary electrode 32, of the surface of the first planarization layer 6 away from the first base 1, so that the entire structure of the touch electrode 31 that is disposed on the surface of the auxiliary electrode 32 away from the first base 1 may be substantially flat. In this way, in the case where the display substrate 100 is applied to the display apparatus, the distances between the touch electrode 31 and the touched positions may be substantially uniform, so as to avoid affecting the touch sensitivity of the display apparatus.

In addition, for example, depths of the plurality of grooves E in the first planarization layer 6 are equal or approximately equal, which may not only avoid increasing difficulty of a process of forming the first planarization layer 6, but also ensure that thicknesses of the auxiliary electrodes 32 disposed in the plurality of grooves E are equal or approximately equal. In a process of adjusting the resistances of the touch units 3 by using the auxiliary electrodes 32, by setting thicknesses of the plurality of auxiliary electrodes 32 to be equal or approximately equal, it is possible to adjust the resistances of the auxiliary electrodes 32 by adjusting the areas of the auxiliary electrodes 32 (i.e., areas of orthogonal projections of the auxiliary electrodes 32 on the first base 1) to adjust the resistances of the touch units 3. In this way, the number of variables that affect the resistances of the auxiliary electrodes 32 is reduced, so that it is beneficial to reduce the difficulty of manufacturing the display substrate 100.

In some embodiments, for the touch unit 3 including the auxiliary electrode 32 and the touch electrode 31, there are various connection manners between the touch unit 3 and the touch signal line 2, which may be determined according to actual needs.

For example, as shown in FIGS. 7 to 10, the auxiliary electrode 32 is located on the side of the touch electrode 31 proximate to the first base 1, and the surface of the auxiliary electrode 32 proximate to the touch electrode 31 is in contact with the surface of the touch electrode 31 proximate to the auxiliary electrode 32.

Figure 10:
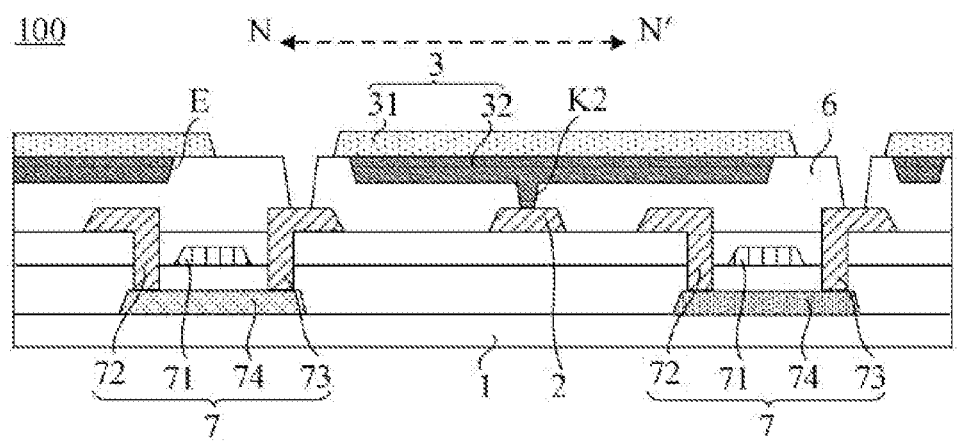

In some examples, as shown in FIG. 10, the first planarization layer 6 is provided with a plurality of second via holes K2 therein, and the second via hole K2 exposes a portion of a surface of the touch signal line 2 away from the first base 1. Orthogonal projections of the plurality of second via holes K2 on the first base 1 are within orthogonal projections of the plurality of grooves E on the first base 1, respectively.

In this case, each auxiliary electrode 32 may be electrically connected to a corresponding touch signal line 2 through at least one second via hole K2. That is, the touch unit 3 may be electrically connected to the corresponding touch signal line 2 through the auxiliary electrode 32.

Figure 7:
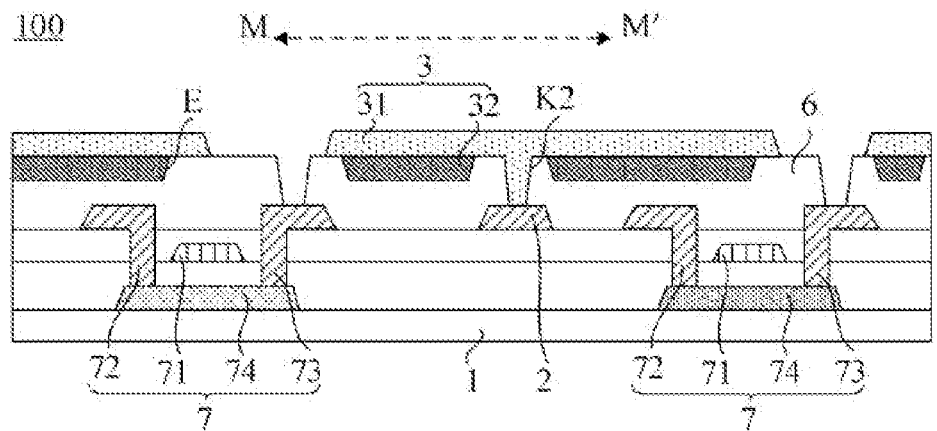
FIG. 7 is a sectional view of the display substrate taken along the line M-M' in FIG. 3.
Figure 8:
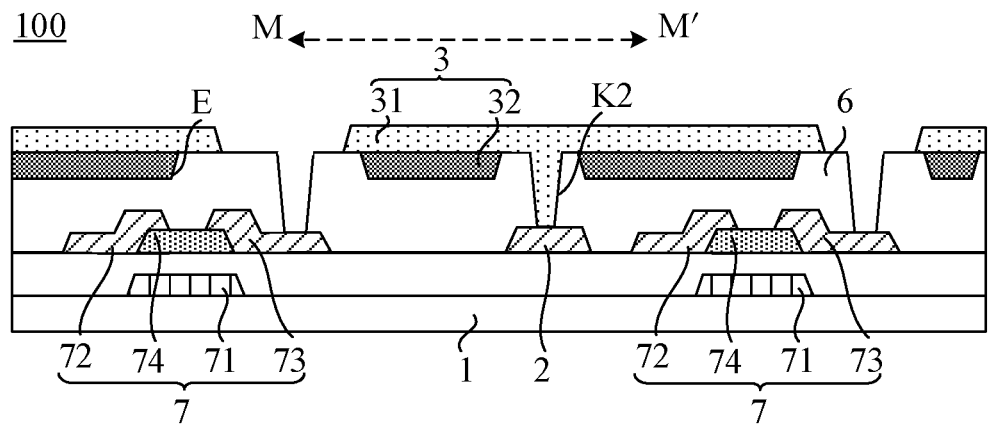
FIG. 8 is another sectional view of the display substrate taken along the line M-M' in FIG. 3.
Figure 9:
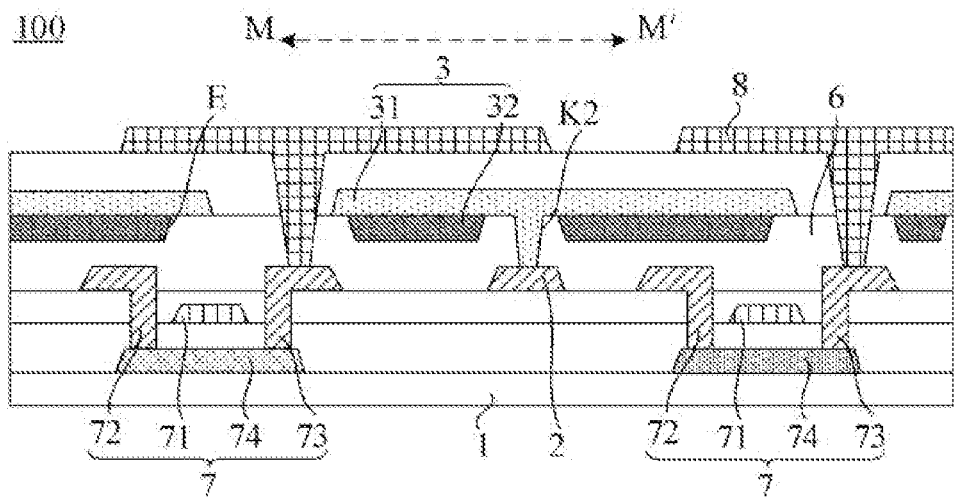
FIG. 9 is yet another sectional view of the display substrate taken along the line M-M' in FIG. 3.

In some other examples, the first planarization layer 6 is provided with a plurality of second via holes K2 therein, as shown in FIGS. 7 to 9, the second via hole K2 exposes a portion of a surface of the touch signal line 2 away from the first base 1. Orthogonal projections of the plurality of second via holes K2 on the first base 1 do not overlap with orthogonal projections of the plurality of grooves E on the first base 1.

In this case, the touch electrode 31 may be electrically connected to a corresponding touch signal line 2 through at least one second via hole K2. That is, the touch unit 3 may be electrically connected to the corresponding touch signal line 2 through the touch electrode 31.

Figure 6:
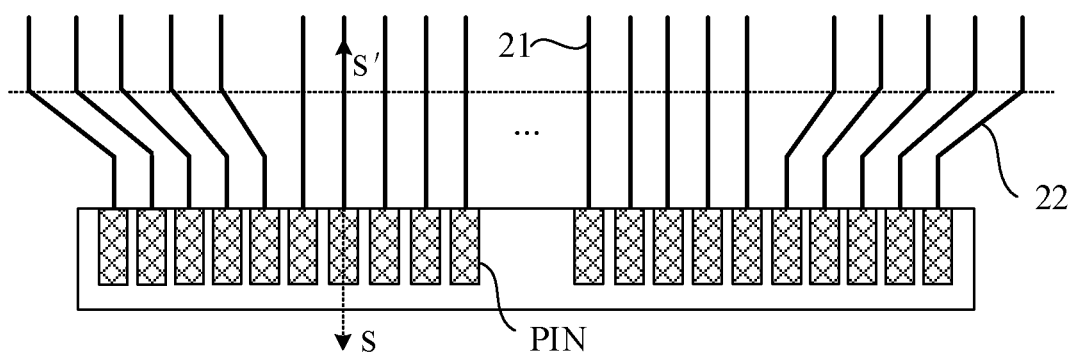
FIG. 6 is an enlarged view of a region Q in the display substrate in FIG. 2.

In some embodiments, as shown in FIG. 6, the bonding region B is provided with a plurality of conductive pins PIN therein. Among the plurality of touch signal lines 2, at least one touch signal line 2 is electrically connected to a conductive pin PIN, so as to achieve the bonding the touch signal line 2 in the bonding region B. Here, each touch signal line 2 is electrically connected to the conductive pin PIN through a second portion 22 thereof.

Figure 5:
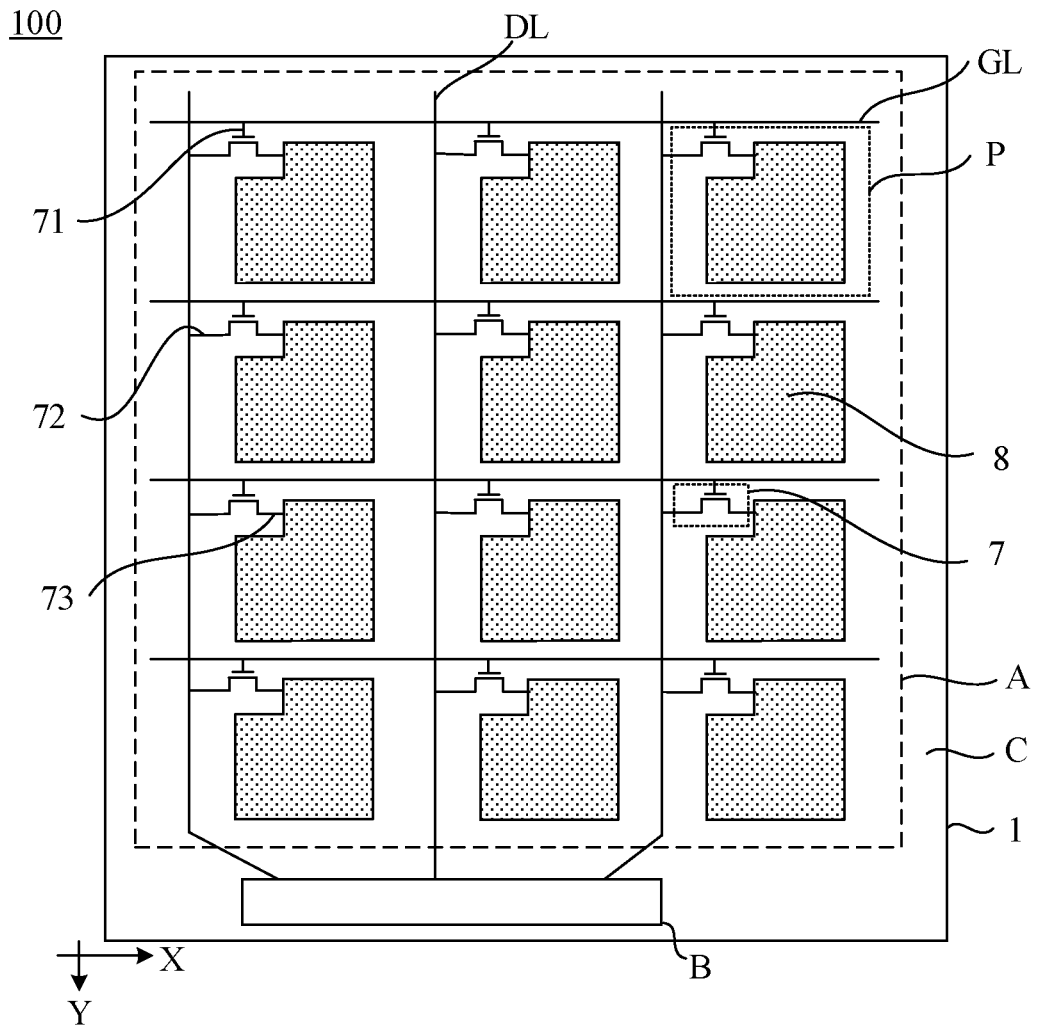
FIG. 5 is a structural diagram of yet another display substrate, in accordance with some embodiments of the present disclosure.

In some embodiments, as shown in FIG. 5, the display region A includes a plurality of sub-pixel regions P, and the plurality of sub-pixel regions P may be arranged, for example, in an array. The display substrate 100 further includes a plurality of gate lines GL and a plurality of data lines DL that are disposed on a side of the base 1 and located in the display region A. The plurality of data lines DL extend in the first direction Y, and the plurality of gate lines GL extend in the second direction X.

The plurality of gate lines GL and the plurality of data lines DL cross and are insulated from each other to define the plurality of sub-pixel regions P.

In some embodiments, as shown in FIGS. 5, and 7 to 12, the display substrate 100 further includes a plurality of thin film transistors 7 that are disposed on a side of the first base 1 and located in the display region A. Each thin film transistor 7 includes a gate 71, a source 72 and a drain 73.

For example, a thin film transistor 7 may be disposed in each sub-pixel region P. As shown in FIG. 5, sub-pixel regions P arranged in a line in the first direction Y may be referred to as a same column of sub-pixel regions P, and sub-pixel regions P arranged in a line in the second direction X may be referred to as a same row of sub-pixel regions P. Thin film transistors 7 in the same row of sub-pixel regions P may be electrically connected to, for example, a gate line GL, and thin film transistors 7 in the same column of sub-pixel regions P may be electrically connected to a data line DL. Each thin film transistor 7 may be electrically connected to a corresponding gate line GL through the gate 71 thereof, and electrically connected to a corresponding data line DL through one of the source 72 and the drain 73 (e.g., the source 72) thereof.

Alternatively, the thin film transistors 7 in the same row of sub-pixel regions P may be electrically connected to gate lines GL, which is not limited in the embodiments of the present disclosure.

Here, at least one data line DL may be electrically connected to a conductive pin PIN, so as to achieve bonding the data line DL in the bonding region B. In this way, a data signal from the bonding region B may be transmitted to the data line DL.

In some embodiments, the first portions 21 of the plurality of touch signal lines 2 may be disposed in a same layer as the sources 72, the drains 73 and the data lines GL.

It will be noted that, the "same layer" mentioned herein refers to a layer structure that is formed by a film layer for forming specific patterns formed by a same film forming process and then by one patterning process using a same mask. Depending on different specific patterns, the patterning process may include a plurality of exposure, development or etching processes, the specific patterns in the formed layer structure may be continuous or discontinuous, and these specific patterns may also be at different heights or have different thicknesses. In this way, the first portions 21 of the touch signal lines 2, the sources 72, the drains 73 and the data lines DL may be formed simultaneously, which is beneficial to simplify the process of manufacturing the display substrate 100.

Here, the first portions 21 of the touch signal lines 2 and the data lines DL extend in the first direction Y. In this way, it is convenient for arranging patterns included in the display substrate 100, so as to avoid the situation that the first portions 21 of the touch signal lines 2 intersect with the data lines DL to cause the short circuit.

In some examples, an arrangement of the second portions 22 of the plurality of touch signal lines 2 is related to structures of the conductive pins PIN electrically connected thereto.

Figure 13:
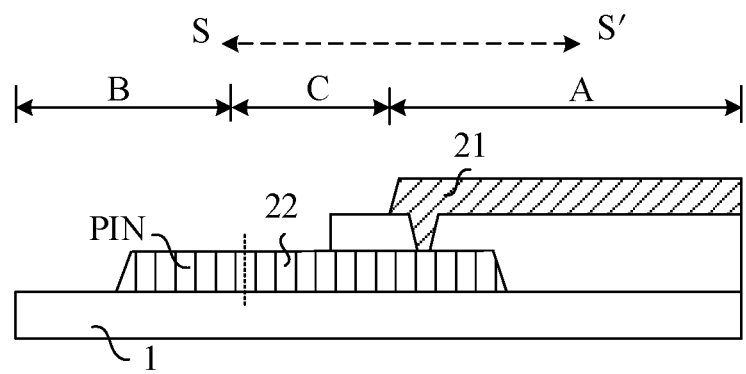
FIG. 13 is a sectional view of the structure taken along the line S-S' in FIG. 6.

For example, the plurality of conductive pins PIN may be dispose in a same layer as the gates 71. In this case, the second portions 22 of the plurality of touch signal lines 2 may be disposed in a same layer as the gates 71, and as shown in FIG. 13, a second portion 22 of each touch signal line 2 and the respective conductive pin PIN are an integral structure. A first portion 21 of each touch signal line 2 may be electrically connected to the second portion 22 of the touch signal line 2 through a via hole.

Figure 14:
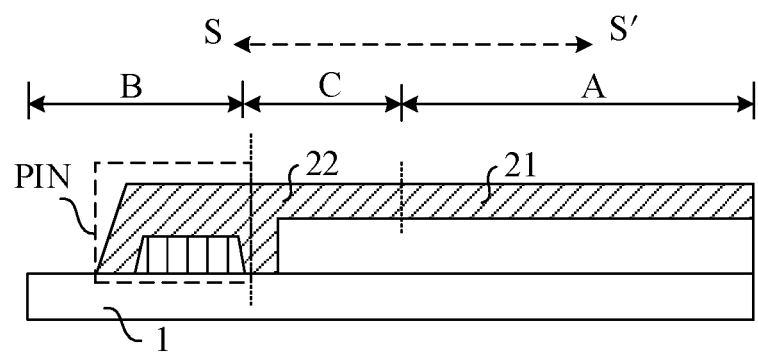
FIG. 14 is another sectional view of the structure taken along the line S-S' in FIG. 6.

For another example, as shown in FIG. 14, the plurality of conductive pins PIN include portions disposed in a same layer as the sources 72 and the drains 73. In this case, the second portions 22 of the plurality of touch signal lines 2 may be disposed in a same layer as the sources 72 and the drains 73. The first portion 21 and the second portion 22 of each touch signal line 2 may be an integral structure.

By arranging the second portions 22 of the touch signal lines 2 in the same layer as the gates 71, or in the same layer as the sources 72 and the drains 73, it is beneficial to simplify the process of manufacturing the display substrate 100.

In some examples, as shown in FIGS. 7 to 12, each thin film transistor 7 further includes an active layer 74.

The thin film transistor 7 has various structures, which are related to a positional relationship between the active layer 74 and the gate 71. A structure of the thin film transistor 7 in some embodiments of the present disclosure may be determined according to actual needs.

For example, as shown in FIG. 7, the active layer 74 is disposed on a side of the gate 71 proximate to the first base 1. In this case, the structure of the thin film transistor 7 is a top-gate structure.

For example, as shown in FIG. 8, the active layer 74 is disposed on a side of the gate 71 away from the first base 1. In this case, the structure of the thin film transistor 7 is a bottom-gate structure.

In some embodiments, as shown in FIGS. 5 and 9, the display substrate 100 further includes a plurality of pixel electrodes 8.

In some examples, as shown in FIG. 9, the plurality of pixel electrodes 8 may be disposed on a side of the plurality of touch electrodes 3 away from the first base 1; alternatively, the plurality of pixel electrodes 8 may be disposed on a side of the plurality of touch units 3 proximate to the first base 1, which is not limited in the present disclosure.

Here, as shown in FIG. 5, in a case where each thin film transistor 7 is electrically connected to the corresponding data line DL through the source 72, each pixel electrode 8 may be electrically connected to the drain 73 of the thin film transistor 7. In a case where each thin film transistor 7 is electrically connected to the corresponding data line DL through the drain 73, each pixel electrode 8 may be electrically connected to the source 72 of the thin film transistor 7.

In some embodiments, the plurality of touch units 3 included in the display substrate 100 further serve as common electrodes. In this way, in a case where the display apparatus to which the display substrate 100 is applied is in a display period, common voltage signals may be transmitted to the plurality of touch units 3, and data signals may be transmitted to the plurality of pixel electrodes 8, so that electric fields may be generated between the plurality of touch electrodes 31 and the plurality of pixel electrodes 8, and thus liquid crystal molecules in the display apparatus are deflected due to actions of the electric fields, thereby achieving the display of the display apparatus.

It will be noted that in a case where the display substrate 100 includes the first planarization layer 6 and the plurality of grooves E are disposed in the first planarization layer 6, distances between different portions of the touch unit 3 and the corresponding pixel electrode 8 may be uniform or substantially uniform, so that the electric fields generated between the portions of the touch unit 3 and the corresponding pixel electrode 8 are substantially same. In the display period, deflection angles of the liquid crystal molecules located in the electric fields may be substantially equal, so as to ensure a good display effect of the display apparatus.

In addition, by providing the auxiliary electrodes 32, it is possible to make the common voltage signals transmitted to the touch units 3 at different positions be substantially same (basically have no difference), so as to ensure the good display effect of the display apparatus.

In some embodiments, a material of the auxiliary electrode 32 may be various, which may be determined according to actual needs.

In some examples, as shown in FIG. 2, the material of the auxiliary electrode 32 includes a light-transmitting conductive material, and the auxiliary electrode 32 is in a shape of a block.

For example, the light-transmitting conductive material may include, for example, indium tin oxide (ITO) with a relatively high light transmittance.

In this case, the auxiliary electrode 32 is arranged in the shape of the block, so that the display substrate 100 has a relatively high light transmittance, a process of forming the auxiliary electrode 32 may be simplified, and then the process of manufacturing the display substrate 100 may be simplified.

In some other examples, as shown in FIG. 3, the material of the auxiliary electrode 32 includes a non-light-transmitting conductive material, and the auxiliary electrode 32 is in a shape of a grid.

For example, the non-light-transmitting conductive material may include, for example, molybdenum (Mo).

In this case, the auxiliary electrode 32 is arranged in the shape of the grid, so as to avoid an influence of the arrangement of the auxiliary electrode 32 on the light transmittance of the display substrate.

Figure 18:
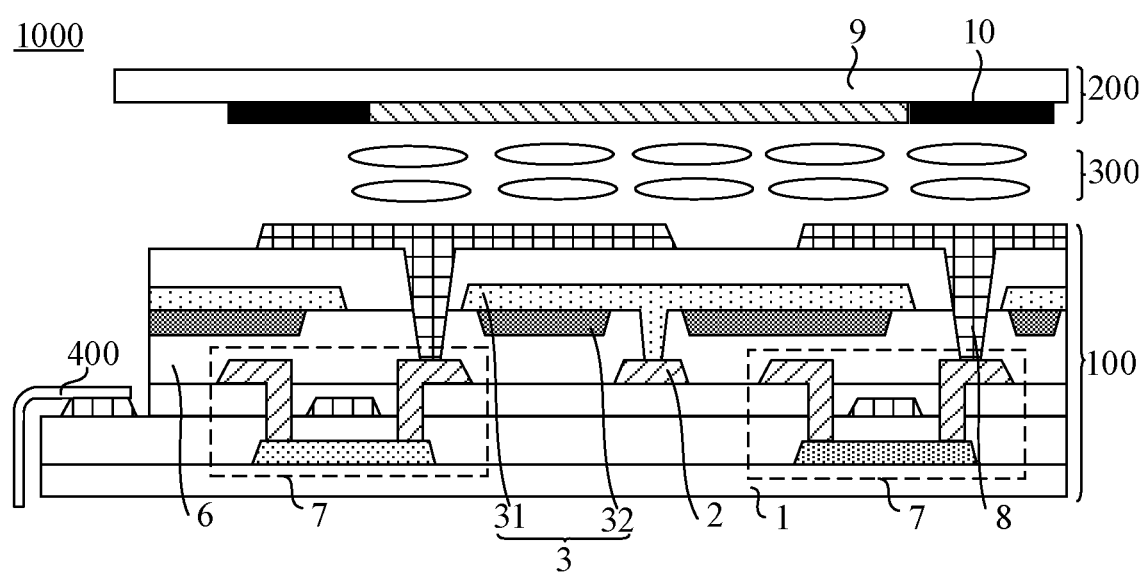
FIG. 18 is a structural diagram of a display apparatus, in accordance with some embodiments of the present disclosure.

Some embodiments of the present disclosure provide a display apparatus 1000, as shown in FIG. 18, the display apparatus 1000 includes: the display substrate 100 in the embodiments described above, an opposite substrate 200 disposed opposite to the display substrate 100, and a liquid crystal layer 300 disposed between the display substrate 100 and the opposite substrate 200.

Beneficial effects that may be achieved by the display apparatus 1000 provided in the embodiments of the present disclosure are the same as the beneficial effects that may be achieved by the display substrate 100 provided in the embodiments, and will not be repeated here.

Based on this, in some examples, as shown in FIG. 18, the opposite substrate 200 is not provided with a common electrode therein.

In some examples, as shown in FIG. 18, the opposite substrate 200 includes a second base 9 and black matrixes 10 disposed on a side of the second base 9 proximate to the display substrate 100.

The second base 9 may have the same structure or type as the first base 1, which will not be repeated here.

Here, the black matrixes 10 may shield the thin film transistors 7, the gate lines GL and the data lines DL in the display substrate 100, thereby preventing external light from being reflected.

In some examples, in a case where the material of the auxiliary electrode 32 included in the display substrate 100 includes the non-light-transmitting conductive material and the auxiliary electrode 32 is in the shape of the grid, an orthogonal projection of the auxiliary electrode 32 on the second base 9 is within an orthogonal projection of the black matrix 10 on the second base 9.

In this way, it may be ensure that the arrangement of the auxiliary electrode 32 does not basically affect the light transmittance of the display apparatus 1000.

In some embodiments, as shown in FIG. 18, the display apparatus 1000 further includes a touch and display driver integration chip 400 disposed in the bonding region B of the display substrate 100. The touch and display driver integration chip 400 may be referred to as a TDDI chip 400.

In some examples, the TDDI chip 400 is electrically connected to the plurality of touch signal lines 2 in the display substrate 100. In this way, the TDDI chip 400 may transmit signals to the plurality of touch units 3 included in the display substrate 100 through the plurality of touch signal lines 2.

For example, in a case where the plurality of conductive pins PIN are disposed in the bonding region B, and the plurality of touch signal lines 2 are electrically connected to the plurality of conductive pins PIN, the TDDI chip 400 may be electrically connected to the plurality of conductive pins PIN, so as to achieve electrical connection between the TDDI chip 400 and the plurality of touch signal lines 2.

Since the plurality of touch units 3 may further serve as the common electrodes, the TDDI chip 400 may be configured to transmit common voltage signals to the plurality of touch units 3 through the plurality of touch signal lines 2 in the display period of the display apparatus 1000, and transmit the touch control signals to the plurality of touch units 3 through the plurality of touch signal lines 2 in the touch period of the display apparatus 1000.

In some embodiments, the display apparatus 1000 is any product or component having a display function, such as a mobile phone, a tablet computer, a television, a monitor, a notebook computer, a digital frame, or a navigator.

Figure 15:
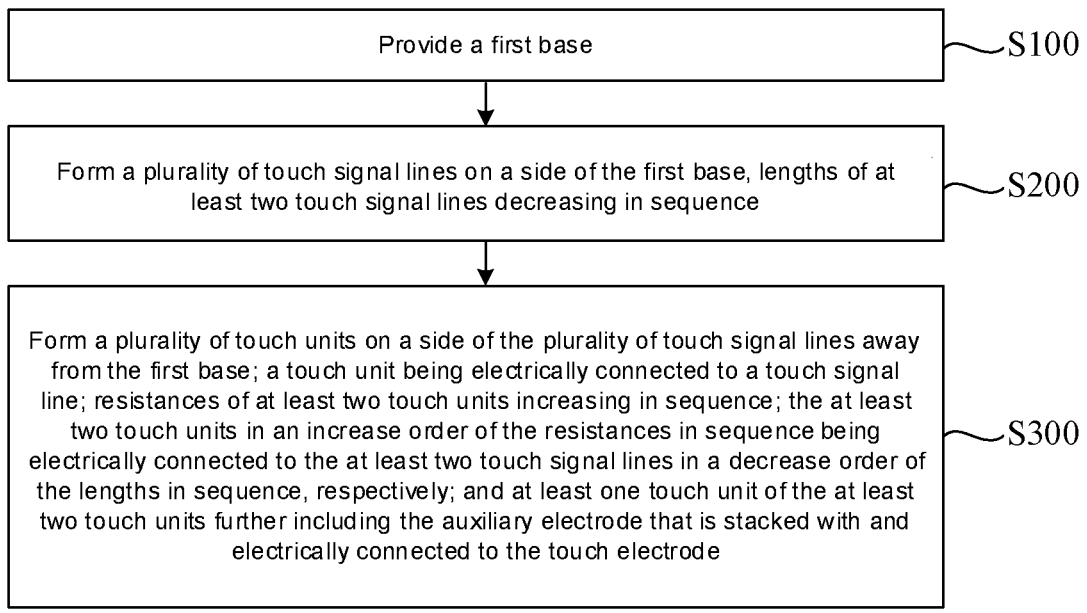
FIG. 15 is a flow diagram of a manufacturing method for a display substrate, in accordance with some embodiments of the present disclosure.

Some embodiments of the present disclosure provide a method for manufacturing to a display substrate. As shown in FIG. 15, the manufacturing method for the display substrate includes S100 to S300.

In S100, a first base 1 is provided.

Here, as for a structure and a type of the first base 1, reference may be made to the description of the first base 1 in the embodiments described above, which will not be repeated here.

Figure 17:
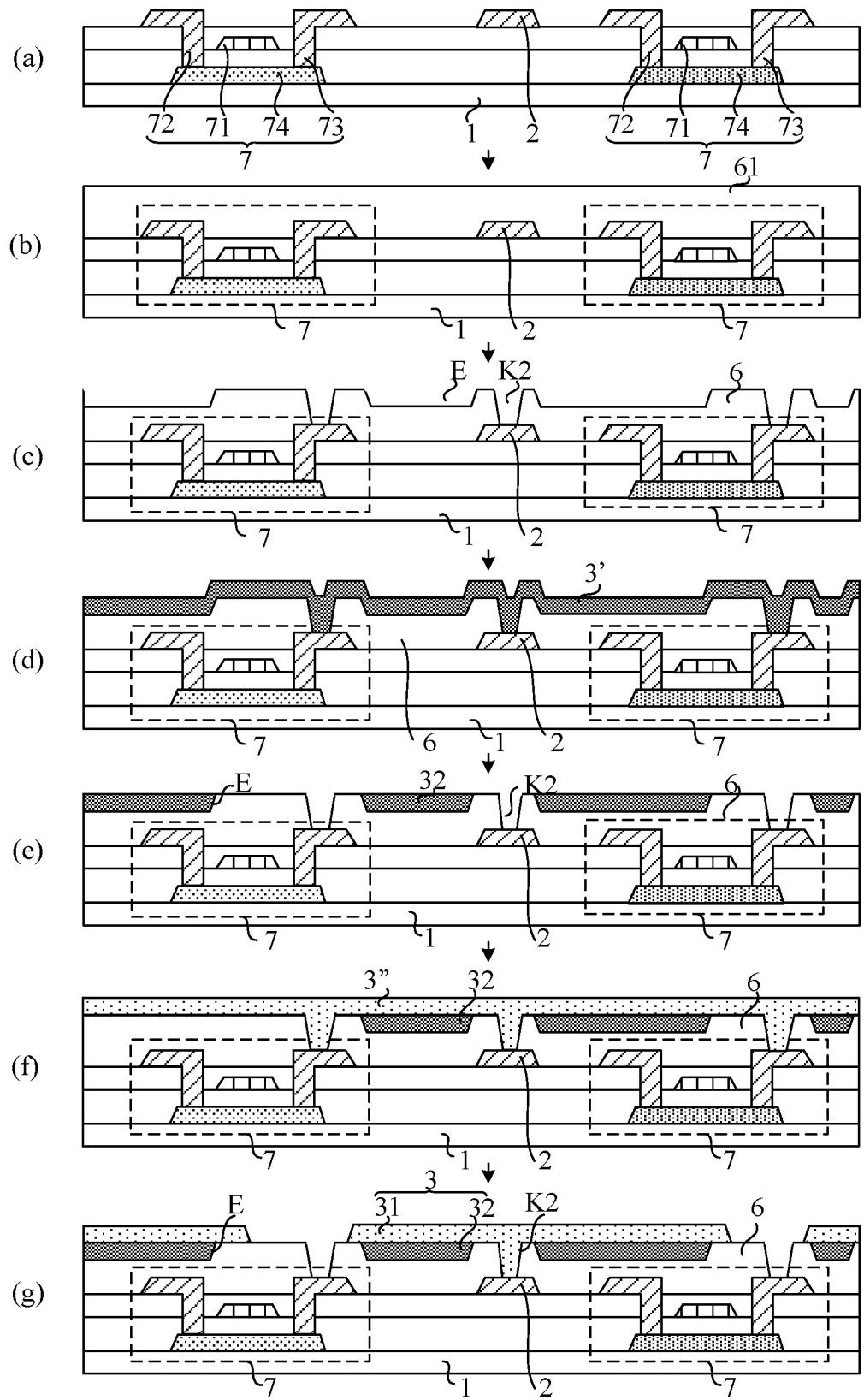
FIG. 17 is a process diagram of manufacturing a display substrate, in accordance with some embodiments of the present disclosure.

In S200, as shown in (a) of FIG. 17, a plurality of touch signal lines 2 are formed on a side of the first base 1, lengths of at least two touch signal lines 2 decreasing in sequence.

For example, the plurality of touch signal lines 2 may be formed by using a photolithography process and a wet etching process, etc.

Here, as for an arrangement of the plurality of touch signal lines 2, reference may be made to the description of the touch signal lines 2 in the embodiments described above, which will not be repeated here.

In S300, as shown in (g) of FIG. 17, a plurality of touch units 3 are formed on a side of the plurality of touch signal lines 2 away from the first base 1; a touch unit 3 is electrically connected to a touch signal line 2. Resistances of at least two touch units 3 increase in sequence, and the at least two touch units 3 in an increase order of the resistances in sequence are electrically connected to the at least two touch signal lines 2 in a decrease order of the lengths in sequence, respectively; at least one touch unit 3 further includes of the at least two touch units 3 the auxiliary electrode 32 that is stacked with and electrically connected to the touch electrode 31.

As for a structure of the touch unit 3 and a relationship between the touch unit 3 and the touch signal line 2, reference may be made to the description in the embodiments described above, which will not be repeated here.

Beneficial effects that may be achieved by the manufacturing method for the display substrate provided in some embodiments of the present disclosure are the same as the beneficial effects that may be achieved by the display substrate provided in the embodiments, and will not be repeated here.

Figure 16:
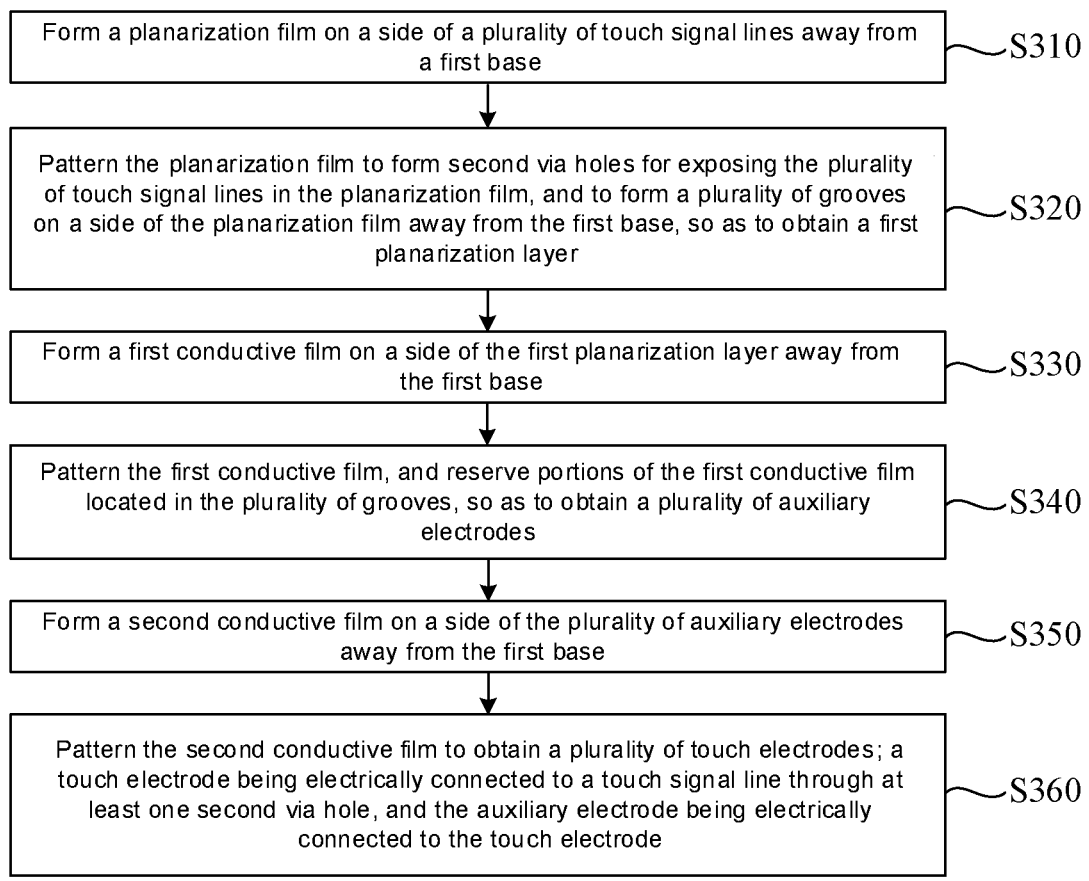
FIG. 16 is a flow diagram of S300 in FIG. 15.

In some embodiments, as shown in FIG. 16, in a case where the auxiliary electrodes 32 are located on a side of the touch electrodes 31 proximate to the first base 1, forming the plurality of touch units 3 on the side of the plurality of touch signal lines 2 away from the first base 1 in S300 includes S310 to S360.

In S310, as shown in (b) of FIG. 17, a planarization film 61 is formed on the side of the plurality of touch signal lines 2 away from the first base 1.

For example, the planarization film 61 may be formed through a plasma enhanced chemical vapor deposition (PECVD) process. A material of the planarization film 61 may be, for example, an organic resin.

In S320, as shown in (c) of FIG. 17, the planarization film 61 is patterned to form second via holes K2 for exposing the plurality of touch signal lines 2 in the planarization film 61, and to form a plurality of grooves E on a surface of the planarization film 61 away from the first base 1, so as to obtain a first planarization layer 6.

Here, the planarization film 61 is patterned by using various processes, which may be determined according to actual needs.

For example, one of the second via holes K2 and the grooves E may be formed by using a first photomask process, and the other one of the second via holes K2 and the grooves E may be formed by using a second photomask process.

For example, the second via holes K2 and the grooves E are formed by using a halftone mask process in one patterning process.

In S330, as shown in (d) of FIG. 17, a first conductive film 3' is formed on a side of the first planarization layer 6 away from the first base 1.

For example, the first conductive film 3' may be formed by using a sputtering process. A material of the first conductive film 3' may be, for example, ITO or Mo.

In S340, as shown in (e) of FIG. 17, the first conductive film 3' is patterned, and portions of the first conductive film 3' located in the plurality of grooves E are reserved, so as to obtain the plurality of auxiliary electrodes 32.

For example, the first conductive film 3' is patterned by using the photolithography process and the wet etching process.

In S350, as shown in (f) of FIG. 17, a second conductive film 3" is formed on a side of the plurality of auxiliary electrodes 32 away from the first base 1.

For example, the second conductive film 3" may be formed by using the sputtering process. A material of the second conductive film 3" may be, for example, ITO or indium gallium zinc oxide (IGZO).

In S360, as shown in (g) of FIG. 17, the second conductive film 3" is patterned to obtain a plurality of touch electrodes 31, a touch electrode 31 is electrically connected to a touch signal line 2 through at least one second via hole K2, and the auxiliary electrode 32 is electrically connected to the touch electrode 31.

That is, after the plurality of touch electrodes 31 are obtained, of a part of the plurality of touch electrodes 31, each touch electrode 31 constitutes a touch unit 3 independently, and is electrically connected to a corresponding touch signal line 2 through at least one second via hole K2; of the other part of the plurality of touch electrodes 31, each touch electrode 31 is located on a surface of an auxiliary electrode 32 away from the first base 1, and constitutes a touch unit 3 together with the auxiliary electrode 32, and each of the other part of the touch units 3 is electrically connected to the respective touch signal line 2 through the auxiliary electrode 32 or the touch electrode 31.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A display substrate, comprising:
   a first base;
   a plurality of touch signal lines disposed on a side of the first base, lengths of at least two touch signal lines decreasing in sequence;
   a plurality of touch units disposed on a side of the plurality of touch signal lines away from the first base, wherein a touch unit is electrically connected to a touch signal line, resistances of at least two touch units increase in sequence, and the at least two touch units in an increasing order of the resistances in sequence are electrically connected to the at least two touch signal lines in a decreasing order of the lengths in sequence, respectively; and a first planarization layer disposed between the plurality of touch signal lines and the plurality of touch units;

wherein the plurality of touch units each include a touch electrode, and at least one touch unit of the at least two touch units further includes an auxiliary electrode that is stacked with and electrically connected to a touch electrode included in the at least one touch unit; and wherein in a touch unit including an auxiliary electrode and a touch electrode, a surface of the auxiliary electrode proximate to the touch electrode is in direct contact with a surface of the touch electrode proximate to the auxiliary electrode, the auxiliary electrode is located on a side of the touch electrode proximate to the first base, a surface of the first planarization layer away from the first base is provided with a plurality of grooves therein, and the auxiliary electrode is disposed in a groove of the plurality of grooves.

2. The display substrate according to claim 1, wherein in a touch unit including an auxiliary electrode and a touch electrode, an orthogonal projection of the auxiliary electrode on the first base is within an orthogonal projection of the touch electrode on the first base.

3. The display substrate according to claim 1, wherein areas of orthogonal projections of the touch electrodes included in the plurality of touch units on the first base are approximately equal.

4. The display substrate according to claim 1, wherein the plurality of touch signal lines extend substantially in a first direction, and are sequentially arranged in a second direction; the first direction intersects with the second direction;

the plurality of touch signal lines include a plurality of groups of touch signal lines, and each group of touch signal lines includes at least one touch signal line; and a length of a group of touch signal lines proximate to the edge of the first base are greater than a length of a group of touch signal lines proximate to the middle of the first base, and a resistance of a touch unit connected to the group of touch signal lines proximate to the edge of the first base are less than a resistance of a touch unit connected to the group of touch signal lines proximate to the middle of the first base.

5. The display substrate according to claim 4, wherein each group of touch signal lines includes touch signal lines, in the first direction that is a direction from an end of the first base to an opposite end thereof, resistances of touch units that are connected to at least one group of touch signal lines increase in sequence.

6. The display substrate according to claim 4, wherein each group of touch signal lines includes touch signal lines, areas of orthogonal projections, on the first base, of auxiliary electrodes in touch units that are connected to at least one group of touch signal lines decreases in sequence in the first direction.

7. The display substrate according to claim 1, wherein resistances of touch units that are connected to touch signal lines with approximately equal lengths are approximately equal.

8. The display substrate according to claim 1, wherein a sum of resistances of each touch signal line and a touch unit connected thereto is approximately equal.

9. The display substrate according to claim 1, wherein a thickness of the auxiliary electrode and a depth of the groove are approximately equal.

10. The display substrate according to claim 1, wherein the display substrate has a display region and a bonding region;

the display substrate further comprises:

a plurality of thin film transistors disposed in the display region, each thin film transistor including a gate, a source and a drain, wherein each touch signal line includes a first portion and a second portion, the first portion is located in the display region, an end of the second portion is electrically connected to the first portion, and another end of the second portion extends into the bonding region;

the first portion of the touch signal line is disposed in a same layer as the source and the drain; and the second portion of the touch signal line is disposed in a same layer as the gate, or is disposed in a same layer as the source and the drain.

11. The display substrate according to claim 1, wherein in a touch unit including an auxiliary electrode and a touch electrode, a material of the auxiliary electrode includes a light-transmitting conductive material, and the auxiliary electrode is in a shape of a block; or a material of the auxiliary electrode includes a non-light-transmitting conductive material, and the auxiliary electrode is in a shape of a grid.

12. A manufacturing method for a display substrate, comprising:

providing a first base;

forming a plurality of touch control signal lines on a side of the first base, lengths of at least two touch signal lines decreasing in sequence; and forming a plurality of touch units on a side of the plurality of touch signal lines away from the first base, a touch unit being electrically connected to a touch signal line;

wherein resistances of at least two touch units increase in sequence, the at least two touch units in an increasing order of the resistances in sequence are electrically connected to the at least two touch signal lines in a decreasing order of the lengths in sequence, respectively; the plurality of touch units each include a touch electrode; and at least one touch unit of the at least two touch units further includes an auxiliary electrode that is stacked with and electrically connected to a touch electrode of the at least one touch unit; and wherein in a touch unit including an auxiliary electrode and a touch electrode, a surface of the auxiliary electrode proximate to the touch electrode is in direct contact with a surface of the touch electrode proximate to the auxiliary electrode, and the auxiliary electrode is located on a side of the touch electrode proximate to the first base; and forming the plurality of touch units on the side of the plurality of touch signal lines away from the first base includes:

forming a planarization film on the side of the plurality of touch signal lines away from the first base;

patterning the planarization film to form second via holes for exposing the plurality of touch signal lines in the planarization film, and to form a plurality of grooves on a surface of the planarization film away from the first base, so as to obtain a first planarization layer;

forming a first conductive film on a side of the first planarization layer away from the first base;

patterning the first conductive film, and reserving portions of the first conductive film located in the plurality of grooves, so as to obtain a plurality of auxiliary electrodes;

forming a second conductive film on a side of the plurality of auxiliary electrodes away from the first base; and patterning the second conductive film to obtain a plurality of touch electrodes, wherein the auxiliary electrode is electrically connected to the touch electrode.

13. A display apparatus, comprising:
the display substrate according to claim 1;
an opposite substrate disposed opposite to the display substrate; and
a liquid crystal layer disposed between the display substrate and the opposite substrate.

14. The display apparatus according to claim 13, wherein the opposite substrate includes:
a second base; and
a black matrix disposed on a side of the second base proximate to the display substrate, wherein
a material of the auxiliary electrode in the display substrate includes a non-light-transmitting conductive material, and the auxiliary electrode is in a shape of a grid,
an orthogonal projection of the auxiliary electrode on the second base is within an orthogonal projection of the black matrix on the second base.

15. The display apparatus according to claim 13, further comprising a touch and display driver integration chip disposed in the bonding region of the display substrate, wherein
the touch and display driver integration chip is electrically connected to the plurality of touch signal lines of the display substrate; and
the touch and display driver integration chip is configured to transmit common voltage signals to the plurality of touch units of the display substrate through the plurality of touch signal lines in a display period of the display apparatus, and to transmit touch control signals to the plurality of touch units through the plurality of touch signal lines in a touch period of the display apparatus.

16. The display substrate according to claim 1, wherein the first planarization layer is provided with a plurality of second via holes therein, and a second via hole exposes a portion of a surface of the touch signal line away from the first base;
wherein orthogonal projections of the plurality of second via holes on the first base are within orthogonal projections of the plurality of grooves on the first base, respectively; and
wherein in a touch unit including an auxiliary electrode and a touch electrode, the auxiliary electrode is electrically connected to a corresponding touch signal line through at least one second via hole of the plurality of second via holes.

17. The display substrate according to claim 1, wherein the first planarization layer is provided with a plurality of second via holes therein, and a second via hole exposes a portion of a surface of the touch signal line away from the first base;
wherein orthogonal projections of the plurality of second via holes on the first base are within orthogonal projections of the plurality of grooves on the first base, respectively; and
wherein in a touch unit including an auxiliary electrode and a touch electrode, the touch electrode is electrically connected to a corresponding touch signal line through at least one second via hole of the plurality of second via holes.

18. The manufacturing method according to claim 12, wherein an auxiliary electrode of the plurality of auxiliary electrodes or a touch electrode of the plurality of touch electrodes is electrically connected to a touch signal line of the plurality of touch signal lines through at least one second via hole, and the auxiliary electrode is electrically connected to the touch electrode.

* * * * *